United States Patent
Li et al.

(10) Patent No.: US 11,974,132 B2
(45) Date of Patent: Apr. 30, 2024

(54) ROUTING METHOD, APPARATUS, AND SYSTEM

(71) Applicant: HUAWEI TECHNOLOGIES CO., LTD., Shenzhen (CN)

(72) Inventors: Hua Li, Xi'an (CN); Bo Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 394 days.

(21) Appl. No.: 16/898,326

(22) Filed: Jun. 10, 2020

(65) Prior Publication Data

US 2020/0305001 A1    Sep. 24, 2020

Related U.S. Application Data

(63) Continuation of application No. PCT/CN2019/099792, filed on Aug. 8, 2019.

(30) Foreign Application Priority Data

Aug. 23, 2018    (CN) .................. 201810970120.2
Oct. 31, 2018    (CN) .................. 201811289488.9

(51) Int. Cl.
*H04W 12/102*   (2021.01)
*H04W 12/06*    (2021.01)
*H04W 40/24*    (2009.01)

(52) U.S. Cl.
CPC .......... *H04W 12/102* (2021.01); *H04W 12/06* (2013.01); *H04W 40/248* (2013.01)

(58) Field of Classification Search
CPC . H04W 12/102; H04W 12/06; H04W 40/248; H04W 12/08; H04W 12/106;
(Continued)

(56) References Cited

U.S. PATENT DOCUMENTS

2009/0061863 A1\*   3/2009   Huggett ............... H04L 63/101
                                                               455/434
2018/0007030 A1    1/2018   Penov et al.
(Continued)

FOREIGN PATENT DOCUMENTS

CN      101222356 A      7/2008
CN      104883339 A      9/2015
(Continued)

OTHER PUBLICATIONS

3GPP TS 33.501 V15.1.0 (Jun. 2018),3rd Generation Partnership Project;Technical Specification Group Services and System Aspects;Security architecture and procedures for 5G system(Release 15),total 152 pages.
S2-188090 Nokia et al., "23.502: Updating / Correcting Routing ID towards UE", SA WG2 Meeting #128bis ,Aug. 20 24, 2018, Sophia Antipolis,total 10 pages.
(Continued)

*Primary Examiner* — Alexander Lagor
*Assistant Examiner* — Lydia L Noel
(74) *Attorney, Agent, or Firm* — Stein IP, LLC

(57) ABSTRACT

A routing method, apparatus, and system, related to the field of communications technologies, to update a routing indicator in a subscription concealed identifier when a user is migrated to a new unified subscriber data management UDM network element and the routing indicator in the subscription concealed identifier changes. The method includes: sending, by an authentication server function AUSF network element, a first authentication vector obtaining request to a first unified data management UDM network element; and if the AUSF network element receives a routing indicator RI sent by the first UDM network element, sending the RI to an access and mobility management function AMF network element. The method is applied to a process in which a terminal updates the RI.

24 Claims, 19 Drawing Sheets

(58) Field of Classification Search
CPC .. H04W 12/10; H04W 40/02; H04L 63/0414; H04L 63/123
See application file for complete search history.

(56) References Cited

U.S. PATENT DOCUMENTS

| | | | | |
|---|---|---|---|---|
| 2019/0174449 | A1* | 6/2019 | Shan | H04W 60/00 |
| 2019/0261136 | A1* | 8/2019 | Niemi | H04W 8/08 |
| 2020/0221281 | A1* | 7/2020 | Rajadurai | H04W 8/06 |
| 2021/0337380 | A1* | 10/2021 | Ianev | H04W 60/04 |

FOREIGN PATENT DOCUMENTS

| | | | | |
|---|---|---|---|---|
| CN | 108012267 A | 5/2018 | | |
| CN | 109842880 A | 6/2019 | | |
| WO | WO-2017091959 A1 * | 6/2017 | | H04W 12/00 |
| WO | WO-2017160227 A1 * | 9/2017 | | H04L 63/062 |
| WO | 2018085784 A1 | 5/2018 | | |
| WO | WO-2018076740 A1 * | 5/2018 | | H04W 12/06 |

OTHER PUBLICATIONS

3GPP TS 23.501 V15.2.0 (Jun. 2018),3rd Generation Partnership Project;Technical Specification Group Services and System Aspects; System Architecture for the 5G System;Stage 2(Release 15),total 216 pages.

3GPP TS 24.501 V15.0.0 (Jun. 2018),3rd Generation Partnership Project;Technical Specification Group Core Network and Terminals;Non-Access-Stratum (NAS) protocol for 5G System (5GS);Stage 3(Release 15),total 337 pages.

3GPP TS 23.502 V15.2.0 (Jun. 2018),3rd Generation Partnership Project;Technical Specification Group Services and System Aspects;Procedures for the 5G System;Stage 2(Release 15),total 308 pages.

XP051541491 S3-182397 Intel, "Steering of Information using Secure Packet",3GPP TSG-SA3 (Security), Meeting SA3#92, Aug. 20, Aug. 24, 2018 Dalian, China,total 8 pages.

XP051574336 S3-183074 C4-187311 SA3,"Reply LS on Routing ID", 3GPP TSG CT WG4 Meeting #86-bis, Vilnius, Lithuania, Oct. 15-19, 2018,total 3 pages.

* cited by examiner

US 11,974,132 B2

ROUTING METHOD, APPARATUS, AND SYSTEM

CROSS-REFERENCE TO RELATED APPLICATIONS

This application is a continuation of International Application No. PCT/CN2019/099792, filed on Aug. 8, 2019, which claims priority to a Chinese Patent Application No. 201811289488.9, filed on Oct. 31, 2018, which claims priority to Chinese Patent Application No. 201810970120.2, filed on Aug. 23, 2018, The disclosures of the aforementioned applications are hereby incorporated by reference in their entireties.

TECHNICAL FIELD

Aspects of this application relate to the field of communications technologies, and in particular, to a routing method, apparatus, and system.

BACKGROUND

Usually, to ensure security of a network and a terminal, when the terminal accesses the network, two-way authentication needs to be performed between the network and the terminal, in other words, the network needs to verify authorization of the terminal, and the terminal also needs to verify security of the network. In a long term evolution (LTE) network, before two-way authentication is completed and when a security context has not been established between a terminal and a network side, an international mobile subscriber identifier (IMSI) of a user is transmitted in plaintext over an air interface. As a result, an attacker may obtain the IMSI from the air interface, to launch a series of attacks.

In a 5th-generation (5G) mobile communications technology, to alleviate attacks launched by an attacker by using an IMSI obtained from an air interface, an encrypted subscription concealed identifier (SUCI) is used to replace an unencrypted subscriber permanent identifier (SUPI) or IMSI before two-way authentication is completed. When accessing a network for authentication, a terminal needs to address a home unified data management (UDM) network element of a user, and obtain an authentication vector from the home UDM network element of the user. Specifically, in a 5G network, when accessing the network for authentication, a terminal sends an authentication request to a network device, and adds an SUCI to the authentication request. The SUCI includes a routing indicator (RI), used to address a home UDM network element of a user.

Currently, a correspondence between an RI and a UDM network element is usually statically configured to ensure that a corresponding UDM network element is addressed based on an RI. However, this static configuration manner lacks flexibility, and cannot meet diversified 5G service requirements in many scenarios of the 5G network.

SUMMARY

Embodiments of this application provide a routing method, apparatus, and system, to change RI information in an SUCI, to more flexibly address a home UDM network element of a user and meet diversified 5G service requirements.

To achieve the foregoing and/or other objectives, the following technical solutions are used in the embodiments of this application.

According to a first aspect, an embodiment of this application provides a routing method. The method may be applied to an AUSF network element or a chip in an AUSF network element, and the method includes: sending, by the authentication server function AUSF network element, a first authentication vector obtaining request to a first unified data management UDM network element; and if receiving a routing indicator RI sent by the first UDM network element, sending, by the AUSF network element, the RI to an access and mobility management function AMF network element.

According to the routing method provided in this embodiment of this application, the AUSF network element sends the first authentication vector obtaining request to the first UDM network element, and if receiving the RI sent by the first UDM network element, the AUSF network element sends the RI to the AMF network element. Subsequently, the AMF network element that manages a terminal delivers the RI to the terminal, so that the terminal can update an RI of the terminal, and the terminal can address a correct UDM network element when accessing a network for authentication.

In a possible design, after sending the first authentication vector obtaining request to the first UDM network element, the AUSF network element may further perform the following steps:

if receiving a redirection message sent by the first UDM network element, sending, by the AUSF network element, a second authentication vector obtaining request to a second UDM network element based on the redirection message; receiving, by the AUSF network element, an RI sent by the second UDM network element; and sending, by the AUSF network element, the RI to the AMF network element.

It can be learned that, by using the foregoing routing method, even if the AUSF network element routes the first authentication vector obtaining request of a user to a non-home UDM network element (the first UDM network element), because the first UDM network element sends the redirection message to the AUSF network element, the AUSF network element can still perform an operation of addressing a home UDM network element of the user next time based on the redirection message, thereby increasing a probability of successful addressing.

In a possible design, to perform integrity protection on the RI, the AUSF network element performs the following steps:

determining, by the AUSF network element, an integrity verification code for the RI based on an integrity protection key and the RI; and sending, by the AUSF network element, the integrity verification code to the AMF network element.

Optionally, the AUSF network element may generate the integrity verification code for the RI according to a preset policy of the AUSF network element. The preset policy includes, for example, but is not limited to, that an RI delivered by a UDM network element is received. Certainly, the AUSF network element may alternatively generate the integrity verification code for the RI after receiving an integrity protection request message sent by a UDM network element. Specifically, the AUSF network element receives an integrity protection request message sent by the first UDM network element or the second UDM network element, and generates the integrity verification code for the RI under triggering of the integrity protection request message, where the integrity protection request message is used to instruct the AUSF network element to generate the integrity verification code for the RI.

According to a second aspect, an embodiment of this application provides a routing method. The method may be applied to a UDM network element or a chip in a UDM network element, and the method includes:

receiving, by a first unified data management UDM network element, a first authentication vector obtaining request sent by an authentication server function AUSF network element; and in response to the first authentication vector obtaining request, sending, by the first UDM network element, a redirection message or a routing indicator RI to the AUSF network element.

In a possible design, a case in which the first UDM network element sends the RI to the AUSF network element is specifically as follows. When the first UDM network element is a home UDM network element of a user, the first UDM network element sends the RI to the AUSF network element.

In a possible design, a case in which the first UDM network element sends the redirection message to the AUSF network element is specifically as follows. When the first UDM network element is not a home UDM network element of a user, the first UDM network element sends the redirection message to the AUSF network element.

In a possible design, in a process in which a terminal requests user data, the first UDM network element instructs the AUSF network element to generate an integrity verification code for the RI. Specifically, the first UDM network element receives a user data obtaining request message sent by an AMF network element, and the first UDM network element sends an integrity protection request message to the AUSF network element, where the integrity protection request message is used to instruct the AUSF network element to generate the integrity verification code for the RI.

In a possible design, after the first UDM network element sends the integrity protection request message to the AUSF network element, the first UDM network element receives an integrity verification code sent by the AUSF network element.

It can be understood that if the AUSF network element has generated the integrity verification code for the RI in a two-way authentication process, after receiving the integrity protection request message sent by the first UDM network element, the AUSF network element directly sends the integrity verification code for the RI to the first UDM network element; or after receiving the integrity protection request message sent by the first UDM network element, if the AUSF network element finds that the AUSF network element has not generated the integrity verification code for the RI, the AUSF network element generates the integrity verification code for the RI, and sends the integrity verification code generated for the RI to the first UDM network element.

The sending, by the first UDM network element, an RI to the AUSF network element includes: sending, by the first UDM network element, an RI protected by the integrity verification code to the AUSF network element.

According to a third aspect, an embodiment of this application provides a routing method. The method may be applied to a terminal or a chip in a terminal, and the method includes:

receiving, by the terminal, a routing indicator RI sent by an access and mobility management function AMF network element, and updating information about a subscription concealed identifier SUCI by using the RI.

By using the routing method, the terminal may receive an updated RI delivered by a network side, and update SUCI information stored in the terminal. Subsequently, the terminal may address a home UDM network element of a user by using an RI included in an updated SUCI.

In a possible design, when integrity protection is performed on the RI, if receiving an integrity verification code corresponding to the RI, the terminal performs integrity verification on the RI by using the integrity verification code.

The updating, by the terminal, information about an SUCI by using the RI may be specifically implemented as follows: if the integrity verification on the RI succeeds, updating, by the terminal, the information about the SUCI by using the RI.

In a possible design, the receiving, by the terminal, an RI sent by an AMF network element may be specifically implemented as the following step:

receiving, by the terminal, a non-access stratum security mode command NAS SMC message sent by the AMF network element, where the NAS SMC message carries the RI.

By using the routing method, the AMF network element may perform, based on an SMC integrity protection mechanism, integrity protection on the RI carried in the NAS SMC message.

According to a fourth aspect, an embodiment of this application provides a routing method. The method is applied to a UDM network element or a chip in a UDM network element, and the method includes: when a home unified data management UDM network element of a user changes from a first UDM network element to a second UDM network element, sending, by the first UDM network element, a routing indicator RI to an access and mobility management function AMF network element.

Herein, the RI sent by the first UDM network element to the AMF network element is an RI corresponding to the second UDM network element.

It can be learned that, by using the foregoing routing method in which the first UDM network element actively initiates an RI update, when learning that the home UDM network element of the user has changed, the first UDM network element may directly deliver, to the AMF network element, an RI corresponding to an updated home UDM network element (namely, the second UDM network element) of the user, thereby eliminating an intermediate signaling procedure and reducing network resource overheads.

In a possible design, if determining that integrity protection needs to be performed on the RI, the first UDM network element may perform the following steps: sending, by the first UDM network element, an integrity protection request message to an AUSF network element, where the integrity protection request message is used to instruct the AUSF network element to generate an integrity verification code for the RI; receiving, by the first UDM network element, the integrity verification code that is sent by the AUSF network element for the RIAUSF network element; and sending, by the first UDM network element, the integrity verification code to the AMF network element.

According to a fifth aspect, an embodiment of this application provides a routing method. The method is applied to an AUSF network element or a chip in an AUSF network element, and the method includes:

receiving, by the authentication server function AUSF network element, an integrity protection request message sent by a first unified data management UDM network element, where the integrity protection request message carries a routing indicator RI; generating, by the AUSF network element, an integrity verification code for the RI based on an integrity protection key and the RI; and sending, by the AUSF network element, the integrity verification code to the first UDM network element.

According to a sixth aspect, an embodiment of this application provides a routing method. The method is applied to a terminal or a chip in a terminal, and the method includes: receiving, by the terminal, a routing indicator RI sent by an access and mobility management function AMF network element; and updating, by the terminal, information about a subscription concealed identifier SUCI by using the RI.

In a possible design, if receiving an integrity verification code corresponding to the RI, in other words, integrity protection is performed on the RI, the terminal performs integrity verification on the RI by using the integrity verification code.

The updating, by the terminal, information about an SUCI by using the RI is specifically implemented as follows: if the integrity verification on the RI succeeds, updating, by the terminal, the information about the SUCI by using the RI.

When a home UDM network element of a user changes from a first UDM network element to a second UDM network element, the terminal may deregister related information in the first UDM network element, and re-register with the second UDM network element. Optionally, the terminal initiates re-registration. If learning that the RI stored in the terminal changes, the terminal registers with the second UDM network element indicated by the RI. Alternatively, the AMF network element initiates re-registration. Specifically, the AMF network element sends a deregistration request message to the terminal, and a cause value carried in the deregistration request message indicates that the RI changes. After receiving the deregistration request message, the terminal registers with the second UDM network element indicated by the RI.

According to a seventh aspect, an embodiment of this application provides a routing apparatus. A processor and a transceiver are disposed in the apparatus. The transceiver is configured to: send a first authentication vector obtaining request to a first unified data management UDM network element; and if an AUSF network element receives a routing indicator RI sent by the first UDM network element, send the RI to an access and mobility management function AMF network element.

In a possible design, the transceiver is further configured to: if receiving a redirection message sent by the first UDM network element, send a second authentication vector obtaining request to a second UDM network element based on the redirection message; receive an RI sent by the second UDM network element; and send the RI to the AMF network element.

In a possible design, the processor is configured to determine an integrity verification code for the RI based on an integrity protection key and the RI, and the transceiver is further configured to send the integrity verification code to the AMF network element.

In a possible design, the transceiver is further configured to receive an integrity protection request message sent by the first UDM network element or the second UDM network element, where the integrity protection request message is used to instruct the AUSF network element to generate the integrity verification code for the RI.

According to an eighth aspect, an embodiment of this application provides a routing apparatus. A processor and a transceiver are disposed in the apparatus. The transceiver is configured to: receive a first authentication vector obtaining request sent by an authentication server function AUSF network element; and in response to the first authentication vector obtaining request, send a redirection message or a routing indicator RI to the AUSF network element.

In a possible design, that the transceiver is configured to send the RI to the AUSF network element includes: the transceiver is configured to send the RI to the AUSF network element when a first UDM network element is a home UDM network element of a user.

In a possible design, that the transceiver is configured to send the redirection message to the AUSF network element includes: the transceiver is configured to send the redirection message to the AUSF network element when a first UDM network element is not a home UDM network element of a user.

In a possible design, the transceiver is further configured to receive a user data obtaining request message sent by an AMF network element, and send an integrity protection request message to the AUSF network element, where the integrity protection request message is used to instruct the AUSF network element to generate an integrity verification code for the RI.

In a possible design, the transceiver is further configured to send the integrity protection request message to the AUSF network element, and receive the integrity verification code sent by the AUSF network element. That the transceiver is configured to send the RI to the AUSF network element includes: the transceiver is configured to send an RI protected by the integrity verification code to the AUSF network element.

According to a ninth aspect, an embodiment of this application provides a routing apparatus. A processor and a transceiver are disposed in the apparatus. The transceiver is configured to receive a routing indicator RI sent by an access and mobility management function AMF network element. The processor is configured to update information about a subscription concealed identifier SUCI by using the RI.

In a possible design, the processor is further configured to: if the transceiver receives an integrity verification code corresponding to the RI, perform integrity verification on the RI by using the integrity verification code. That the processor is configured to update the information about the SUCI by using the RI includes: the processor is configured to: if the integrity verification on the RI succeeds, update the information about the SUCI by using the RI.

In a possible design, that the transceiver is configured to receive the RI sent by the AMF network element includes: the transceiver is configured to receive a non-access stratum security mode command NAS SMC message sent by the AMF network element, where the NAS SMC message carries the RI.

According to a tenth aspect, an embodiment of this application provides a routing apparatus. A processor and a transceiver are disposed in the apparatus. The transceiver is configured to: when a home unified data management UDM network element of a user changes from a first UDM network element to a second UDM network element, send a routing indicator RI to an access and mobility management function AMF network element.

In a possible design, the transceiver is further configured to: send an integrity protection request message to an AUSF network element, where the integrity protection request message is used to instruct the AUSF network element to generate an integrity verification code for the RI; receive the integrity verification code that is sent by the AUSF network element for the RIAUSF network element; and send the integrity verification code to the AMF network element.

According to an eleventh aspect, an embodiment of this application provides a routing apparatus. A processor and a transceiver are disposed in the apparatus. The transceiver is configured to receive an integrity protection request message sent by a first unified data management UDM network element, where the integrity protection request message carries a routing indicator RI. The processor is configured to generate an integrity verification code for the RI based on an integrity protection key and the RI. The transceiver is further configured to send the integrity verification code to the first UDM network element.

According to a twelfth aspect, an embodiment of this application provides a routing apparatus. A processor and a transceiver are disposed in the apparatus. The transceiver is configured to receive a routing indicator RI sent by an access and mobility management function AMF network element. The processor is configured to update information about a subscription concealed identifier SUCI by using the RI.

In a possible design, the processor is further configured to: if the transceiver receives an integrity verification code corresponding to the RI, perform integrity verification on the RI by using the integrity verification code. That the processor is configured to update the information about the SUCI by using the RI includes: the processor is configured to: if the integrity verification on the RI succeeds, update the information about the SUCI by using the RI.

In a possible design, the processor is further configured to: if an RI stored in a terminal changes, register the terminal with a second UDM network element indicated by the RI.

In a possible design, the processor is further configured to: if the transceiver receives a deregistration request message sent by the AMF network element, and a cause value carried in the deregistration request message indicates that an RI changes, register the terminal with a second UDM network element indicated by the RI.

According to a thirteenth aspect, an embodiment of this application provides a routing apparatus. The routing apparatus has a function of implementing the routing method according to any one of the first aspect, the second aspect, the third aspect, the fourth aspect, the fifth aspect, or the sixth aspect. The function may be implemented by hardware, or may be implemented by hardware by executing corresponding software. The hardware or software includes one or more modules corresponding to the foregoing function.

According to a fourteenth aspect, a routing apparatus is provided, including a processor and a memory. The memory is configured to store a computer executable instruction. When the routing apparatus runs, the processor executes the computer executable instruction stored in the memory, so that the routing apparatus performs the routing method according to any one of the first aspect, the second aspect, the third aspect, the fourth aspect, the fifth aspect, or the sixth aspect.

According to a fifteenth aspect, a routing apparatus is provided, including a processor. The processor is configured to: after being coupled to a memory and reading an instruction in the memory, perform, according to the instruction, the routing method according to any one of the first aspect, the second aspect, the third aspect, the fourth aspect, the fifth aspect, or the sixth aspect.

According to a sixteenth aspect, a computer-readable storage medium is provided. The computer-readable storage medium stores an instruction, and when the instruction runs on a computer, the computer is enabled to perform the routing method according to any one of the first aspect, the second aspect, the third aspect, the fourth aspect, the fifth aspect, or the sixth aspect.

According to a seventeenth aspect, a computer program product including an instruction is provided. When the computer program product runs on a computer, the computer is enabled to perform the routing method according to any one of the first aspect, the second aspect, the third aspect, the fourth aspect, the fifth aspect, or the sixth aspect.

According to an eighteenth aspect, a circuit system is provided. The circuit system includes a processing circuit, and the processing circuit is configured to perform the routing method according to any one of the first aspect, the second aspect, the third aspect, the fourth aspect, the fifth aspect, or the sixth aspect.

According to a nineteenth aspect, a chip is provided. The chip includes a processor. The processor is coupled to a memory. The memory stores a program instruction. When the program instruction stored in the memory is executed by the processor, the routing method according to any one of the first aspect, the second aspect, the third aspect, the fourth aspect, the fifth aspect, or the sixth aspect is implemented.

According to a twentieth aspect, a routing system is provided. The routing system includes the terminal (or the chip in the terminal), the AMF network element (or the chip in the AMF network element), the AUSF network element (or the chip in the AUSF network element), and the UDM network element (or the chip in the UDM network element) in the foregoing aspects.

For a technical effect of any design manner in the second aspect to the twentieth aspect, refer to a technical effect of different design manners in the first aspect. Details are not described herein again.

DESCRIPTION OF EMBODIMENTS

First, technical terms in the embodiments of this application are provided.

SUPI: a user identifier in 5G, used to represent a real identity of a user and having a function similar to that of an IMSI in LTE.

Figure 1:
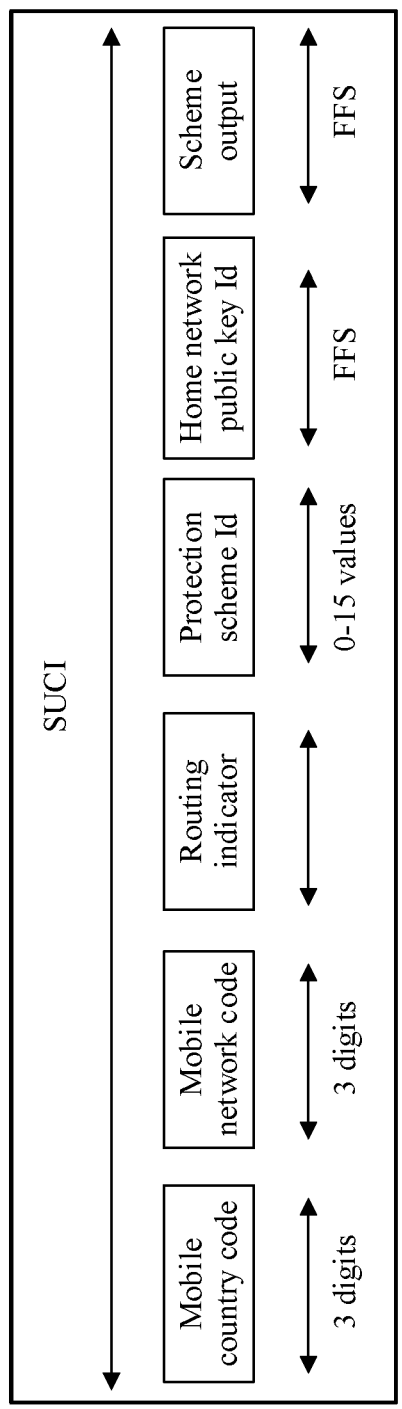
FIG. 1 is a schematic diagram of an SUCI according to an embodiment of this application.

SUCI: In 5G, to prevent a plaintext SUPI from being stolen by an attacker, the SUPI is encrypted by using a public key. An encrypted ciphertext forms an SUCI. Subsequently, a network-side device may decrypt the SUCI by using a private key that is in pair with the public key used for encryption, to obtain the SUPI, to learn a real identity of a user. FIG. 1 shows a structure of an SUCI defined in 3GPP 23.003. The SUCI includes a 3-digit mobile country code (MCC), a 3-digit mobile network code (MNC), and an RI. The MCC is used to address a country in which a home UDM network element of a user is located. The MNC is used to address a network to which the home UDM network element of the user belongs (for example, the UDM network element belongs to China Telecom, or the UDM network element belongs to China Unicom). The RI is used to address the home UDM network element of the user. For detailed descriptions of other information included in the SUCI, refer to the prior art. Details are not described in the embodiments of this application.

Figure 2:
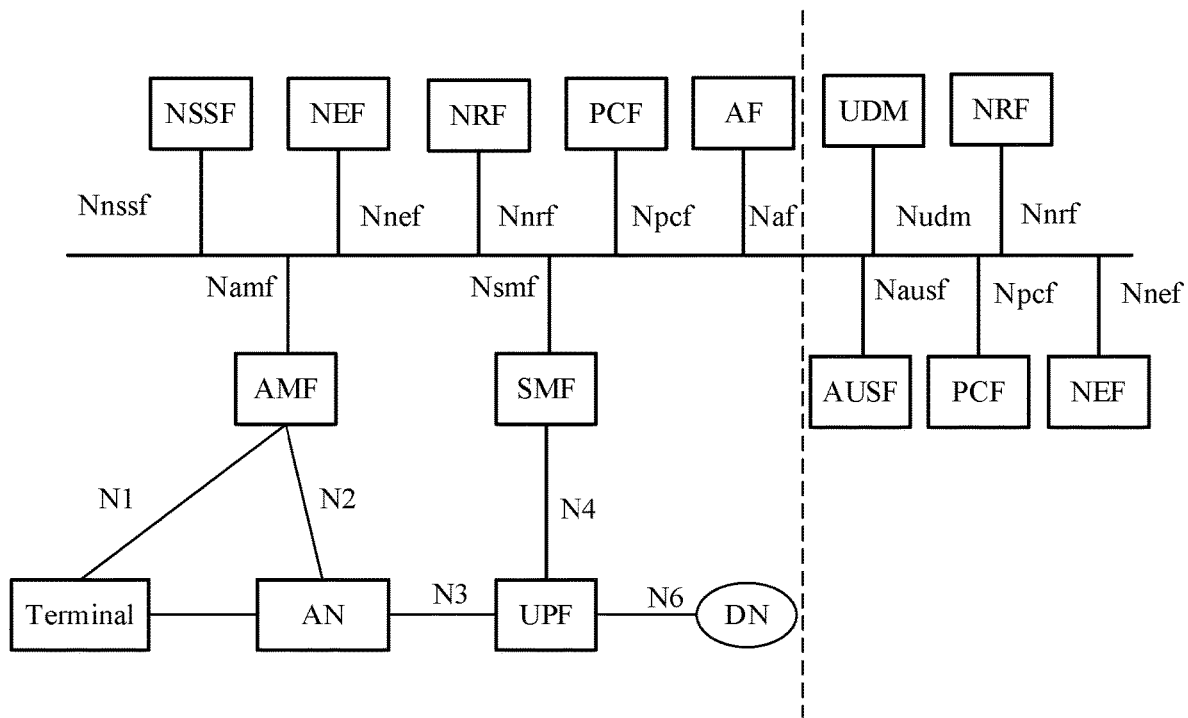
FIG. 2 is a schematic diagram of a 5G network architecture according to an embodiment of this application.

A 5G network architecture in the embodiments of this application is as follows:

As shown in FIG. 2, the system includes a network slice selection function (NSSF) network element, a network exposure function (NEF) network element, a network repository function (NRF) network element, a policy control function (PCF) network element, an application function (AF) network element, a unified data management (UDM) network element, an authentication server function (AUSF) network element, an access and mobility management function (AMF) network element, a session management function (SMF) network element, and an access network (AN) network element. An AN includes network elements or devices such as a wired access network network element, a radio access network (RAN) network element, a user plane function (UPF) network element, and a data network (DN) network element, and a terminal.

The terminal accesses the AN in a wireless (for example, wireless fidelity (Wi-Fi)) or wired manner, and the terminal communicates with the AMF network element by using N1. The AN communicates with the UPF by using N3, and the AN communicates with the AMF network element by using N2. The UPF communicates with the SMF by using N4, and the UPF communicates with the DN network element by using N6. The SMF communicates with the AMF network element by using N11 (not shown in FIG. 2), the SMF communicates with the UDM network element by using N10 (not shown in FIG. 2), and the SMF communicates with the PCF by using N7 (not shown in FIG. 2). The AMF network element communicates with the AUSF network element by using N12 (not shown in FIG. 2), and the AUSF network element communicates with the UDM network element by using N13 (not shown in FIG. 2).

It can be understood that, according to a 5G system deployment requirement, the foregoing network elements may communicate with each other in a specific manner (for example, the terminal communicates with the AMF network element by using N1). The foregoing merely lists a manner of communication between network elements related to the technical solutions in the embodiments of this application. For brevity of description, a manner of communication between other network elements is not described in detail in the embodiments of this application.

Optionally, the terminal in the embodiments of this application may include various devices with a communication function, for example, a handheld device, a wearable device, a computing device, or another processing device connected to a modem. The terminal may further include a personal digital assistant (PDA) computer, a tablet computer, a laptop computer, a machine type communication (MTC) terminal, user equipment (UE), or the like.

Optionally, a name of each network element and a name of an interface between network elements in FIG. 2 are merely examples. In specific implementation, each network element or an interface between network elements may have another name, or a network element may be referred to as an entity. This is not specifically limited in the embodiments of this application. All or some network elements in a core network may be physical entity network elements, or may be virtualized network elements. This is not limited herein.

The following describes the technical solutions in the embodiments of this application with reference to the accompanying drawings in the embodiments of this application. In description of this application, "/" means "or" unless otherwise specified. For example, AB may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of this application, "a plurality of" means two or more than two. In addition, to clearly describe the technical solutions in the embodiments of this application, terms such as "first" and "second" are used in the embodiments of this application to distinguish between same items or similar items that have a basically same function and usage. A person skilled in the art can understand that the terms such as "first" and "second" are not intended to limit a quantity or an execution sequence; and the terms such as "first" and "second" do not indicate a definite difference. In addition, "at least one of "x" or "y"" means "x", "y" or both "x" and "y".

In the embodiments of this application, that a network element (for example, a network element A) obtains information from another network element (for example, a network element B) may mean that the network element A directly receives the information from the network element B, or may mean that the network element A receives the information from the network element B by using another network element (for example, a network element C). When the network element A receives the information from the network element B by using the network element C, the network element C may transparently transmit the information, or may process the information, for example, add the information to different messages for transmission, or filter the information and send only filtered information to the network element A. Similarly, in the embodiments of this application, that the network element A sends information to the network element B may mean that the network element A directly sends the information to the network element B, or may mean that the network element A sends the information to the network element B by using another network element (for example, the network element C).

In addition, the network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

Figure 3:
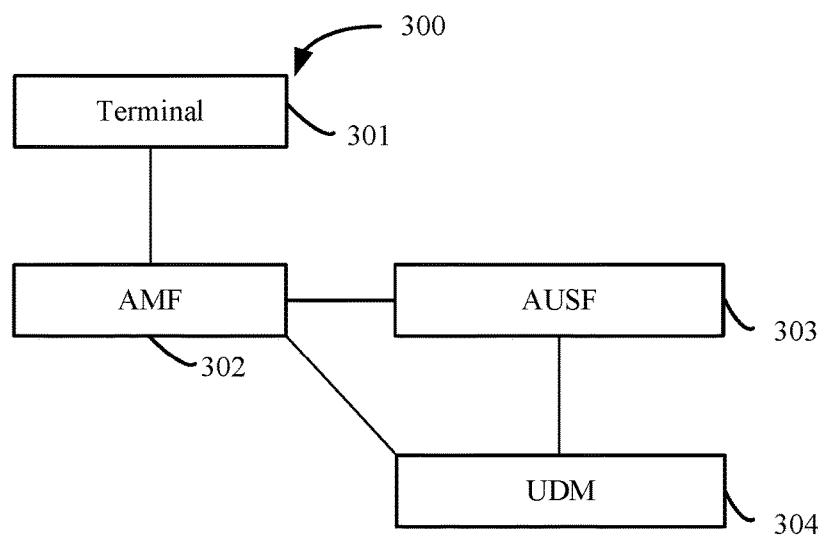
FIG. 3 is a schematic architectural diagram of a routing system according to an embodiment of this application.

As shown in FIG. 3, an embodiment of this application provides a routing system 300. The routing system 300 includes a terminal 301, an AMF network element 302, an AUSF network element 303, and at least one UDM network element 304 (only one UDM network element is provided as an example in FIG. 3).

The UDM network element 304 is configured to: receive an authentication vector obtaining request message from the AUSF network element; determine, based on the request message, whether the UDM network element 304 is a home UDM network element of a user; and if the UDM network element 304 is the home UDM network element of the user, send an RI to the AUSF network element 303 according to a local policy; or if the UDM network element 304 is not the home UDM network element of the user, send a redirection message to the AUSF network element 303, so that the AUSF network element 303 redirects the authentication vector obtaining request message to another UDM network element, or the UDM network element directly sends an authentication vector obtaining request message to the another UDM network element. The UDM network element 304 is further configured to receive a user data obtaining request message sent by the AMF network element, add an RI to a user data obtaining response, and deliver the RI to the AMF network element 302. The UDM network element 304 is further configured to: after determining that the home UDM network element of the user changes, actively initiate a procedure of updating an RI of the terminal. Specifically, when determining that the RI of the terminal needs to be updated, the UDM network element 304 actively delivers an RI to the terminal 301 by using the AMF network element 302, so that the terminal 301 updates an RI in an SUCI.

The AUSF network element 303 is configured to: send the authentication vector obtaining request message to the UDM network element 304, to obtain, in a subsequent procedure, the RI delivered by the UDM network element 304; and send the RI to the AMF network element 302 after receiving the RI sent by the UDM network element 304. Alternatively, after receiving the redirection message sent by the UDM network element 304 shown in FIG. 3, the AUSF network element 303 sends an authentication vector obtaining request message to the another UDM network element according to a preconfigured policy of the AUSF network element 303, to request an RI used for addressing the home UDM network element of the user.

The AMF network element 302 is configured to receive the RI delivered by the AUSF network element 303 or the UDM network element 304, and deliver the RI to the terminal 301.

The terminal 301 is configured to receive the RI from the AMF network element 302, and update information about the SUCI by using the RI.

It should be noted that FIG. 3 shows only a connection relationship between network elements related to the technical solutions in the embodiments of this application, and there may be another connection relationship between network elements. Details are not described herein.

The routing system provided in this embodiment of this application may be applied to the 5G system shown in FIG. 2 or a subsequent evolved system.

Optionally, the terminal 301, the AMF network element 302, the AUSF network element 303, or the UDM network element 304 in FIG. 3 each may be an independent device, or functions of the foregoing network elements may be implemented in one device, for example, may be implemented as different functional modules in one device. This is not specifically limited in this embodiment of this application. It can be understood that the foregoing functional modules may be network elements in a hardware device, or may be software functions running on a hardware device, or may be a virtualized function instantiated on a platform (for example, a cloud platform).

Figure 4:
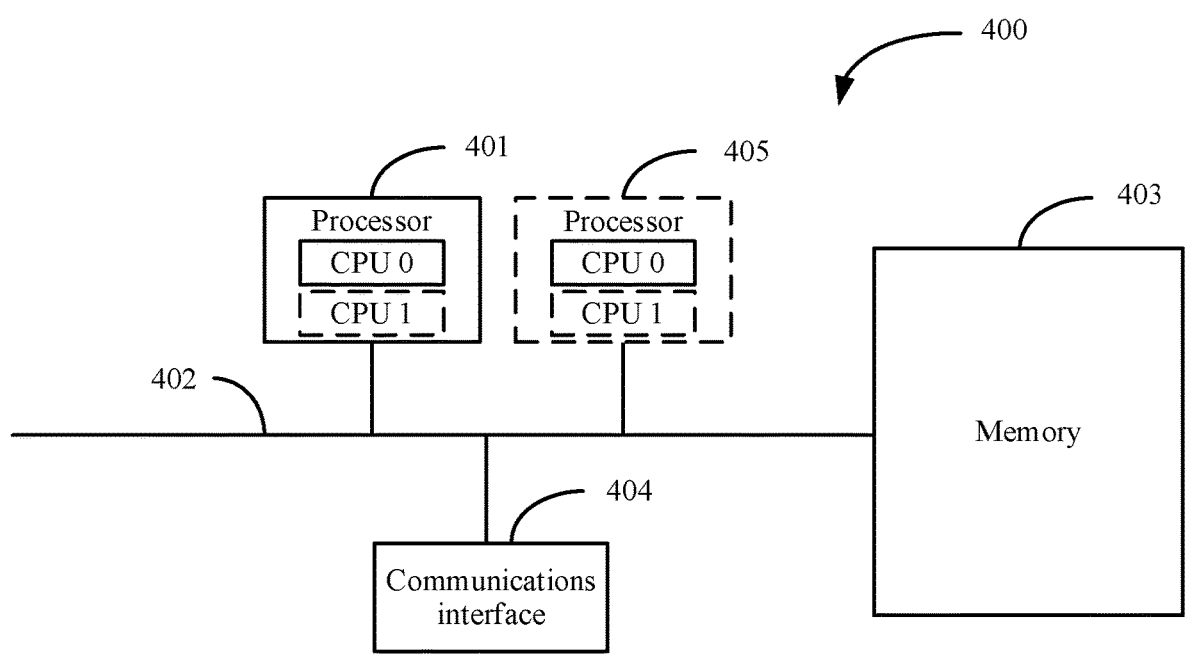
FIG. 4 is a schematic diagram of a structure of a communications device according to an embodiment of this application.

For example, the terminal, the AMF network element, the AUSF network element, or the UDM network element in this embodiment of this application may be implemented by a communications device in FIG. 4. FIG. 4 is a schematic diagram of a hardware structure of a communications device according to an embodiment of this application. The communications device 400 includes at least one processor 401, a communications line 402, a memory 403, and at least one communications interface 404.

The processor 401 may be a general-purpose central processing unit (CPU), a microprocessor, an application-specific integrated circuit (ASIC), or one or more integrated circuits configured to control execution of programs in the solutions of this application.

The communications line 402 may include a channel for transmitting information between the foregoing components.

The communications interface 404 is configured to communicate, by using any apparatus like a transceiver, with another device or a communications network, for example, Ethernet, a radio access network (RAN), or a wireless local area network (WLAN).

The memory 403 may be a read-only memory (ROM), another type of static storage device that can store static information and instructions, a random access memory (RAM), or another type of dynamic storage device that can store information and instructions; or may be an electrically erasable programmable read-only memory (EEPROM), a compact disc read-only memory (CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this does not constitute a limitation herein. The memory may exist independently and is connected to the processor by using the communications line 402. Alternatively, the memory may be integrated with the processor.

The memory 403 is configured to store a computer executable instruction for executing the solutions in the embodiments of this application, and the processor 401 controls execution of the computer executable instruction. The processor 401 is configured to execute the computer executable instruction stored in the memory 403, to implement a routing method provided in the following embodiments of this application.

Optionally, the computer executable instruction in this embodiment of this application may also be referred to as application program code. This is not specifically limited in this embodiment of this application.

In specific implementation, in an embodiment, the processor 401 may include one or more CPUs, for example, a CPU 0 and a CPU 1 in FIG. 4.

In specific implementation, in an embodiment, the communications device 400 may include a plurality of processors. Each of the processors may be a single-core (single-CPU) processor, or may be a multi-core (multi-CPU) processor. The processor herein may be one or more devices, a circuit, and/or a processing core configured to process data (for example, a computer program instruction).

It can be understood that FIG. 4 is merely a schematic diagram of an example hardware structure of the communications device. To implement the technical solutions in the embodiments of this application, the communications device 400 may further include another component. This is not limited in this embodiment of this application.

The communications device 400 may be a general-purpose device or a dedicated device. In specific implementation, the communications device 400 may be a device with a structure similar to that in FIG. 4. A type of the communications device 400 is not limited in this embodiment of this application.

It should be noted that names of messages between network elements, names of parameters in messages, or the like in the following embodiments of this application are merely examples, and there may be other names in specific implementation. This is uniformly described herein. Details are not described in the following again.

Optionally, the routing method provided in the embodiments of this application is applied to a procedure related to two-way authentication between a terminal and a network side. The terminal may perform a two-way authentication procedure with the network side in different scenarios, for example, when the terminal registers with a network, when a location of the terminal is updated, or in a call processing process of the terminal. The following describes the routing method in the embodiments of this application by using an example in which a terminal performs two-way authentication with a network side in a terminal registration scenario.

Figure 5A:
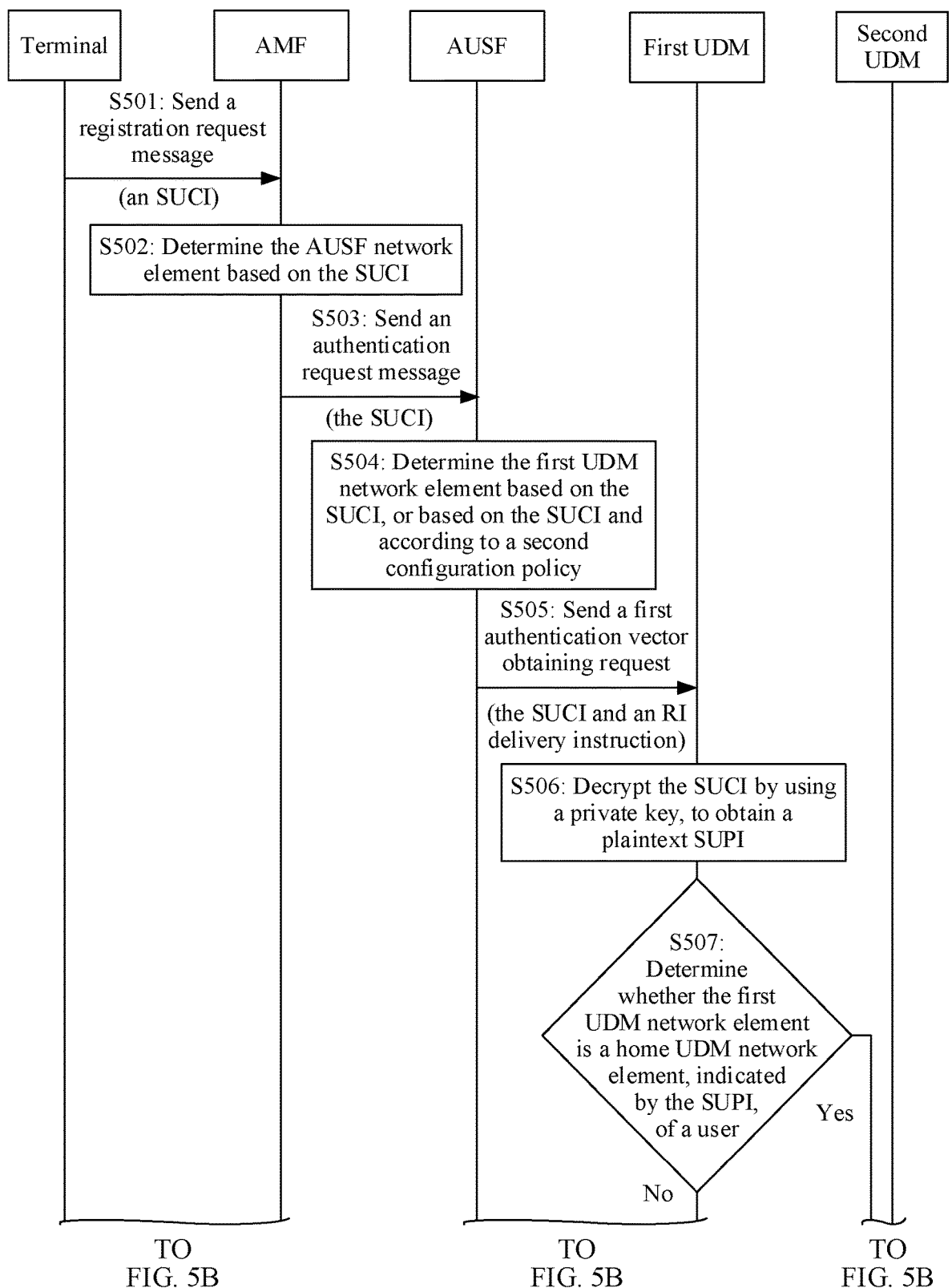
FIG. 5A and FIG. 5B are a flowchart of a routing method according to an embodiment of this application.
Figure 5B:
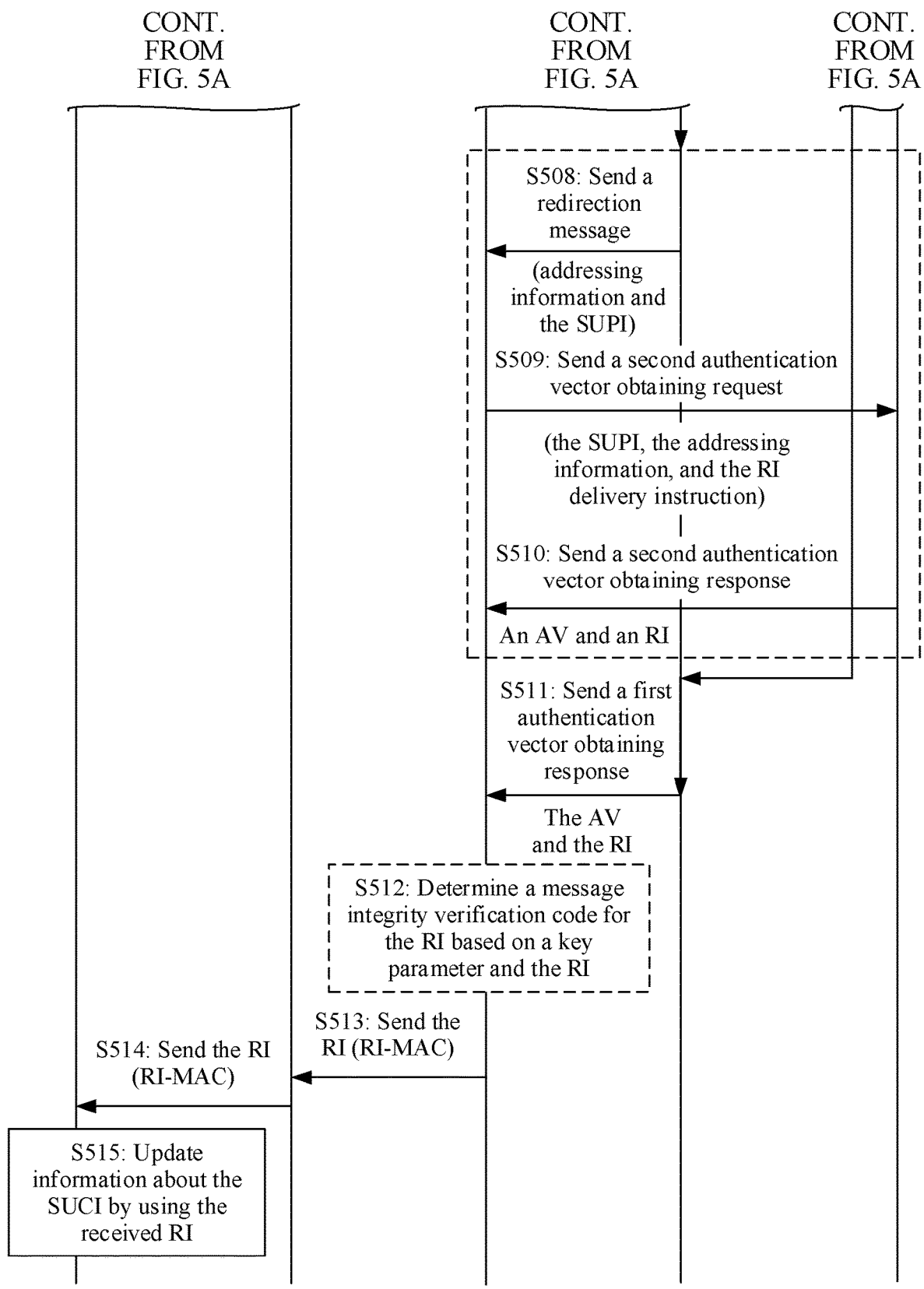

As shown in FIG. 5A and FIG. 5B, an embodiment of this application provides a routing method, including the following steps.

S501: A terminal sends a registration request message to an AMF network element.

Correspondingly, the AMF network element receives the registration request message sent by the terminal.

The registration request message carries an SUCI of a user.

S502: The AMF network element determines an AUSF network element based on the SUCI.

Alternatively, the AMF network element determines an AUSF network element based on the SUCI and according to a first configuration policy.

Alternatively, the AMF network element determines an AUSF network element based on an SUPI. If the AMF network element stores a correspondence between an SUCI and an SUPI, an SUPI corresponding to the SUCI may be obtained.

Optionally, in some scenarios, in some countries or regions, there are a relatively small quantity of users, and all the users belong to one UDM network element or a few UDM network elements. Correspondingly, a relatively small quantity of AUSF network elements may be set in a network, and an RI may be set to a default value. In this case, the RI is not used to point to an AUSF network element, and the RI is not used to point to a UDM network element either. Alternatively, in a future evolution scenario, when an RI is not used to indicate a UDM network element, an SUCI may not include an RI. In these scenarios, S502 may be implemented as follows. The AMF network element selects an AUSF network element based on an MCC and an MNC in the SUCI and according to the first configuration policy.

Optionally, the first configuration policy is selecting a nearest AUSF network element (or an AUSF network element in a preset area range). For example, the AMF network element selects an AUSF network element closest to the current terminal. Alternatively, the AMF network element selects an AUSF network element for the user in a polling manner, to balance load between AUSF network elements.

Alternatively, the AMF network element selects an AUSF network element with a higher priority for the user based on a priority of an AUSF network element.

Optionally, in some other scenarios, in some countries or regions, there are a relatively large quantity of users, and the users separately belong to a plurality of UDM network elements. Correspondingly, an RI is required to indicate an AUSF network element and indicate a home UDM network element of a user. In this scenario, S502 may be implemented as follows. The AMF network element determines an AUSF network element based on an MCC, an MNC, and an RI in the SUCI. In a possible implementation, the AMF network element queries an NRF based on the MCC, the MNC, and the RI in the SUCI, to obtain an AUSF network element that is in the NRF and that corresponds to the MCC, the MNC, and the RI.

S503: The AMF network element sends an authentication request message to the AUSF network element.

Correspondingly, the AUSF network element receives the authentication request message sent by the AMF network element.

The authentication request message carries the SUCI.

In a possible implementation, the AMF network element invokes an NAUSF_UEAuthentication_Authenticate Request service of the AUSF network element to send the authentication request message to the AUSF network element.

S504: The AUSF network element determines a first UDM network element based on the SUCI, or based on the SUCI and according to a second configuration policy.

Similar to a procedure in which the AMF network element determines the AUSF network element, when the RI in the SUCI is not used to indicate a UDM network element, S504 is implemented as follows. The AUSF network element selects a first UDM network element based on the MNC and the MCC in the SUCI, and according to the second configuration policy (for example, based on a priority, in a polling manner, or according to a proximity rule). In some other implementations, if each UDM network element stores a different private key, to avoid a case in which a randomly found UDM network element does not include a private key used for decrypting the SUCI, one default UDM network element or a group of default UDM network elements may be deployed. The one or more UDM network elements include all private keys used for decryption. In this way, the AUSF network element preferentially selects the default UDM network element or a UDM network element in the group of default UDM network elements.

When the RI in the SUCI may point to a UDM network element, S504 is implemented as follows. The AUSF network element determines a first UDM network element based on the MNC, the MCC, and the RI in the SUCI. Certainly, the AUSF network element may query the NRF based on the MNC, the MCC, and the RI, to obtain a first UDM network element corresponding to the MNC, the MCC, and the RI.

S505: The AUSF network element sends a first authentication vector obtaining request to the first UDM network element.

Correspondingly, the first UDM network element receives the first authentication vector obtaining request sent by the AUSF network element.

The first authentication vector obtaining request carries the SUCI.

Optionally, the first authentication vector obtaining request carries an RI delivery instruction.

In a possible implementation, the AUSF network element invokes an NUDM_UEAuthentication_Get Request service of the first UDM network element to send the first authentication vector obtaining request to the first UDM network element, to request to obtain an authentication vector from the first UDM network element.

S506: The first UDM network element decrypts the SUCI by using a private key, to obtain a plaintext SUPI.

S507: The first UDM network element determines whether the first UDM network element is a home UDM network element, indicated by the SUPI, of a user; and if not, performs S508; or if yes, performs S511.

In a possible implementation, the first UDM network element stores an SUPI of a managed user. After obtaining the SUPI of the user, if the first UDM network element finds, through querying, that the first UDM network element does not store the SUPI, the first UDM network element determines that the first UDM network element is not the home UDM network element of the user.

S508: The first UDM network element sends a redirection message to the AUSF network element.

Correspondingly, the AUSF network element receives the redirection message sent by the first UDM network element.

In a possible implementation, the first UDM network element returns an NUDM_UEAuthentication_Get Response service response to send the redirection message to the AUSF network element.

Optionally, the redirection message carries the plaintext SUPI decrypted by the first UDM network element. Alternatively, if the first UDM network element stores addressing information of the home UDM network element, indicated by the SUPI, of the user, the redirection message may carry the addressing information of the home UDM network element of the user. The addressing information of the UDM network element includes, but is not limited to, a fully qualified domain name (FQDN) and an internet protocol (IP) address of the UDM network element, and the like.

S509: The AUSF network element sends a second authentication vector obtaining request to a second UDM network element based on the redirection message.

Correspondingly, the second UDM network element receives the second authentication vector obtaining request sent by the AUSF network element.

Optionally, as described above, if the redirection message received by the AUSF network element carries the plaintext SUPI decrypted by the first UDM network element, the AUSF network element determines the second UDM network element based on the SUPI, and sends the second authentication vector obtaining request to the second UDM network element. In another possible implementation, the AUSF network element queries the NRF based on the MCC, the MNC, and the RI in the SUCI, to obtain a UDM network element that is in the NRF and that corresponds to the MCC, the MNC, and the RI. If the redirection message received by the AUSF network element carries the addressing information of the home UDM network element, indicated by the SUPI, of the user, the AUSF network element determines the second UDM network element based on the addressing information of the home UDM network element of the user, and sends the second authentication vector obtaining request to the second UDM network element.

Optionally, the second authentication vector obtaining request carries an RI delivery instruction.

In a possible implementation, the AUSF network element invokes an NUDM_UEAuthentication_Get Request service of the second UDM network element to send the second authentication vector obtaining request to the second UDM network element.

It can be learned that, by using the foregoing routing method, even if the AUSF network element routes the first authentication vector obtaining request of the user to a non-home UDM network element (the first UDM network element), because the first UDM network element sends the redirection message to the AUSF network element, the AUSF network element can still perform an operation of addressing a home UDM network element of the user next time based on the redirection message, thereby increasing a probability of successful addressing.

S510: The second UDM network element sends an RI to the AUSF network element.

Correspondingly, the AUSF network element receives the RI sent by the second UDM network element.

In a possible implementation, S510 is implemented as follows. The second UDM network element returns an NUDM_UEAuthentication_Get Response service response to send a second authentication vector obtaining response to the AUSF network element, where the second authentication vector obtaining response carries the RI and an authentication vector (AV). The authentication vector includes parameters such as a random number (RAND) and an authentication token (AUTN).

Optionally, when receiving the second authentication vector obtaining request, the second UDM network element delivers the RI to the AUSF network element according to the RI delivery instruction carried in the second authentication vector obtaining request. Alternatively, the second UDM network element may deliver the RI after receiving the second authentication vector obtaining request. Alternatively, when the second UDM network element receives the second vector obtaining request sent by the AUSF network element, and the RI in the SUCI carried in the second vector obtaining request is not used to indicate a UDM network element, or when the second UDM network element receives the second authentication vector obtaining request sent by the AUSF network element and finds that the RI in the second authentication vector obtaining request is inconsistent with an RI corresponding to the second UDM network element, the second UDM network element delivers the RI so that the terminal subsequently quickly addresses the home UDM network element. A condition and an occasion for triggering the second UDM network element to deliver the RI are not limited in this embodiment of this application.

S511: The first UDM network element sends an RI to the AUSF network element.

Correspondingly, the AUSF network element receives the RI sent by the first UDM network element.

In a possible implementation, S511 is implemented as follows. The first UDM network element returns an NUDM_UEAuthentication_Get Response service response to send a first authentication vector obtaining response to the AUSF network element, where the first authentication vector obtaining response carries the RI and an authentication vector.

Referring to the foregoing descriptions, a condition and an occasion for triggering the first UDM network element to deliver the RI are not limited in this embodiment of this application.

(Optional) S512: The AUSF network element determines an integrity verification code for the RI based on an integrity protection key and the RI.

In a possible implementation, in a two-way authentication procedure, the AUSF network element generates a key 1 (for example, KAUSF) related to two-way authentication, and the AUSF network element generates an integrity protection key (Kri) based on KAUSF and a key parameter, and generates an RI integrity verification code (routing indicator-message authentication code, RI-MAC) based on the integrity protection key and the RI. The key parameter is a random number in the authentication vector and/or an incremental counter value. Correspondingly, the AUSF network element may calculate the integrity protection key based on KAUSF and the random number in the authentication vector, or the AUSF network element calculates the integrity protection key based on KAUSF and the counter value, or the AUSF network element calculates the integrity protection key based on KAUSF, the random number in the authentication vector, and the counter value.

A count increment condition may be set for a counter. For example, the increment condition is that the AUSF network element receives an integrity protection request message sent by a UDM network element. To be specific, each time the AUSF network element receives an integrity protection request message from a UDM network element, a count of a counter that is set in the AUSF network element increases by 1.

Optionally, to protect an RI update counter (counter), a counter integrity verification code (counter-MAC or counter integrity message authentication code) may be calculated by using an integrity protection key and the counter. It should be noted that, for a counter and a counter-MAC that appear in subsequent embodiments, reference may be made to the interpretations in this embodiment.

By using the RI integrity protection method, the AUSF network element generates the RI integrity verification code, so that it can be ensured that the RI is not tampered with during transmission on an air interface, thereby improving RI transmission security.

S513: The AUSF network element sends the RI to the AMF network element.

Correspondingly, the AMF network element receives the RI sent by the AUSF network element.

Optionally, when sending the RI to the AMF network element, the AUSF network element also sends the RI integrity verification code. If the AUSF network element generates the integrity protection key by using KAUSF and the counter value or by using KAUSF, the counter value, and the random number in S512, the AUSF network element may further send the counter value to the AMF network element, and optionally, may further send the counter-MAC to the AMF network element.

S514: The AMF network element sends the RI to the terminal.

Correspondingly, the terminal receives the RI sent by the AMF network element.

Optionally, the AMF network element sends the RI integrity verification code when sending the RI to the terminal. When the AUSF network element generates the integrity protection key by using KAUSF and the counter value, the AMF network element delivers the counter value that comes from the AUSF network element to the terminal, so that the terminal subsequently performs integrity protection verification by using the counter value; and optionally, may further send the counter-MAC to the terminal.

In this embodiment of this application, based on a message sending occasion, a network side may specifically implement, in any one of the following at least three manners, a procedure of sending the RI to the terminal.

Figure 6A:
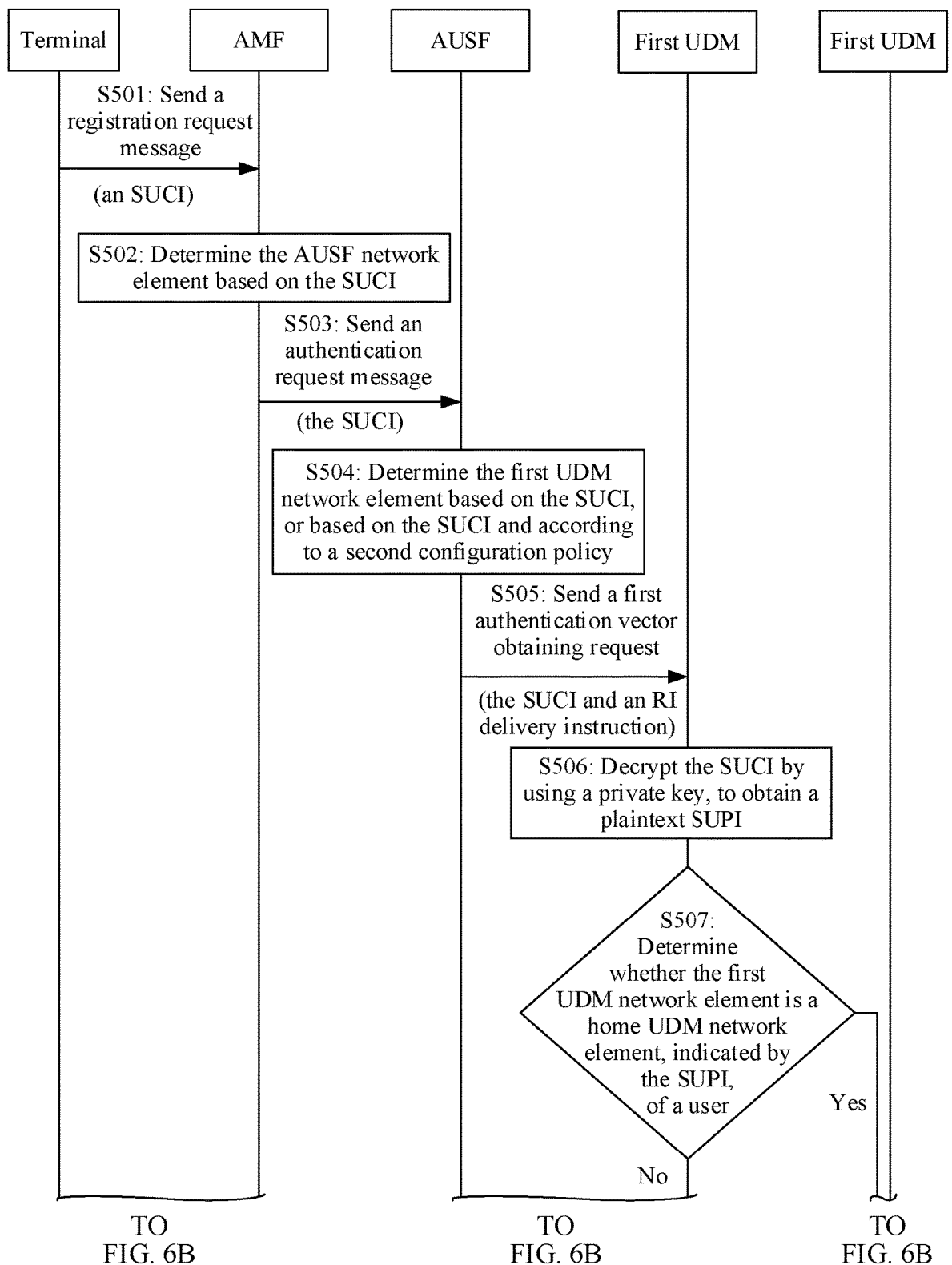
FIG. 6A and FIG. 6B are a flowchart of a routing method according to an embodiment of this application.
Figure 6B:
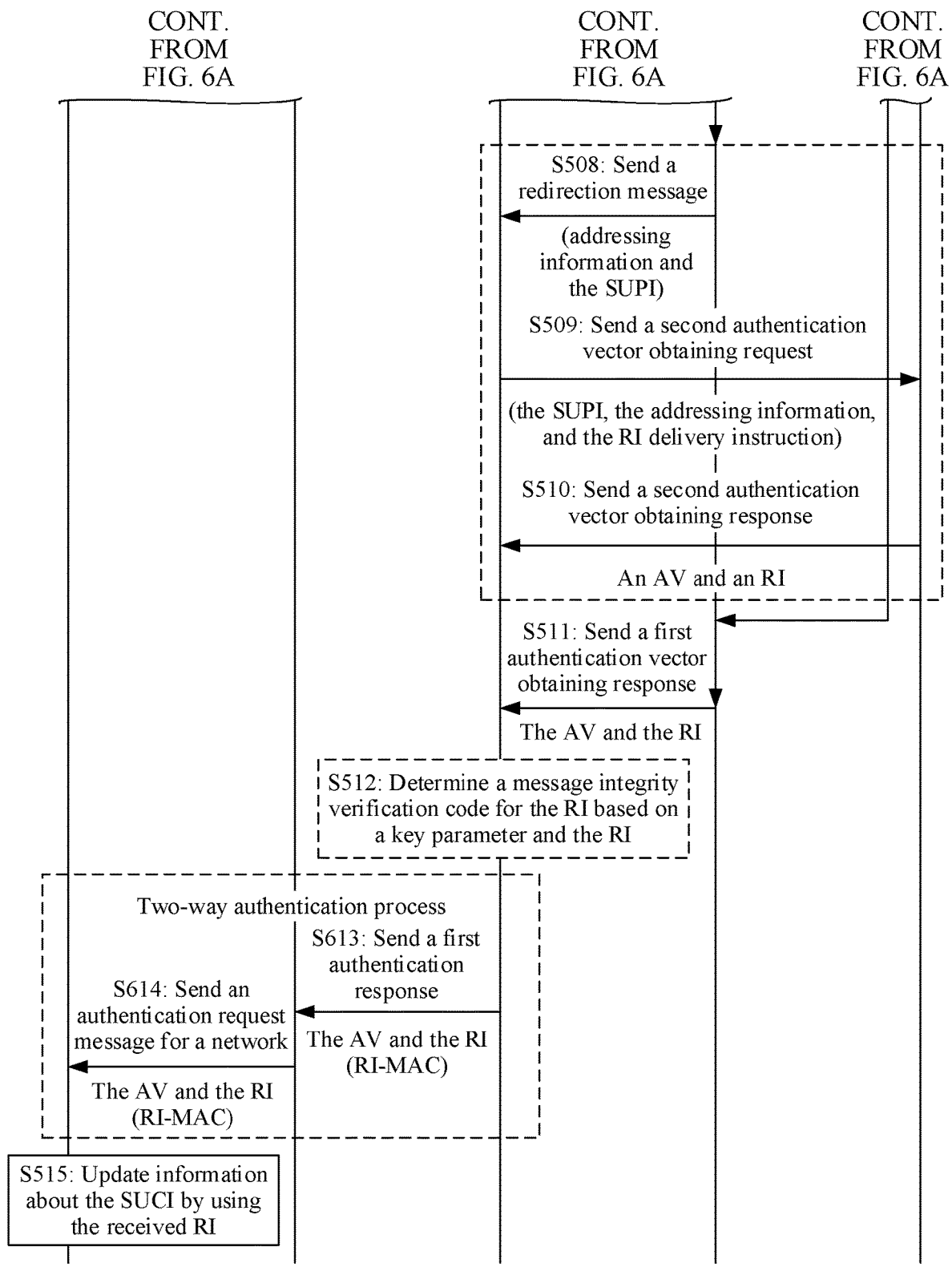

Manner 1: The AUSF network element delivers the RI to the terminal by using the AMF network element in an authentication process. Specifically, as shown in FIG. 6B, S513 and S514 may be replaced with S613 and S614.

S613: The AUSF network element sends a first authentication response to the AMF network element.

Correspondingly, the AMF network element receives the first authentication response sent by the AUSF network element.

In a possible implementation, the AUSF network element returns an NAUSF_UEAuthentication_Authenticate Response service response to send the first authentication response to the AMF network element.

The first authentication response carries the RI.

Optionally, in a two-way authentication process, if the AMF network element invokes an authentication service of the AUSF network element for a plurality of times, the AUSF network element may add the RI to a response message in any authentication service (for example, an authentication success message or an authentication message in another intermediate process), and deliver the RI to the AMF network element.

Optionally, when EAP (extensible authentication protocol) authentication is used, for example, when EAP-AKA' (extensible authentication protocol method for third generation authentication and key agreement) is used, the RI may be in an EAP packet, or may be outside an EAP packet. This is not limited herein.

Optionally, the first authentication response carries an authentication vector. To be specific, when the AMF network element invokes the authentication service of the AUSF network element for a plurality of times, the AUSF network element sends first authentication responses to the AMF network element for a plurality of times, and adds the authentication vector to one of the plurality of first authentication responses. Certainly, as described above, the RI may be further carried in the first authentication response.

Optionally, the first authentication response carries the RI integrity verification code generated in S512. Optionally, the first authentication response carries a counter and a counter-MAC.

S614: The AMF network element sends an authentication request message for a network to the terminal.

Correspondingly, the terminal receives the authentication request message for the network that is sent by the AMF network element.

The authentication request message for the network carries the RI.

Optionally, the authentication request message for the network carries some or all parameters in the authentication vector. Optionally, the authentication request message carries the RI integrity verification code generated in S512. Optionally, the authentication request message carries a counter and a counter-MAC.

The terminal may perform authentication on the network by using some parameters in the received authentication vector (for example, a random number in the authentication vector). When determining that the network is an authorized network, the terminal sends an authentication request response message for the network to the AMF network element, to instruct the AMF network element to perform authentication on the terminal, to complete an entire two-way authentication procedure.

Certainly, the AUSF network element may alternatively deliver the RI to the AMF network element during any other interaction between the AUSF network element and the AMF network element in the two-way authentication process. This is not limited in this application.

Figure 7A:
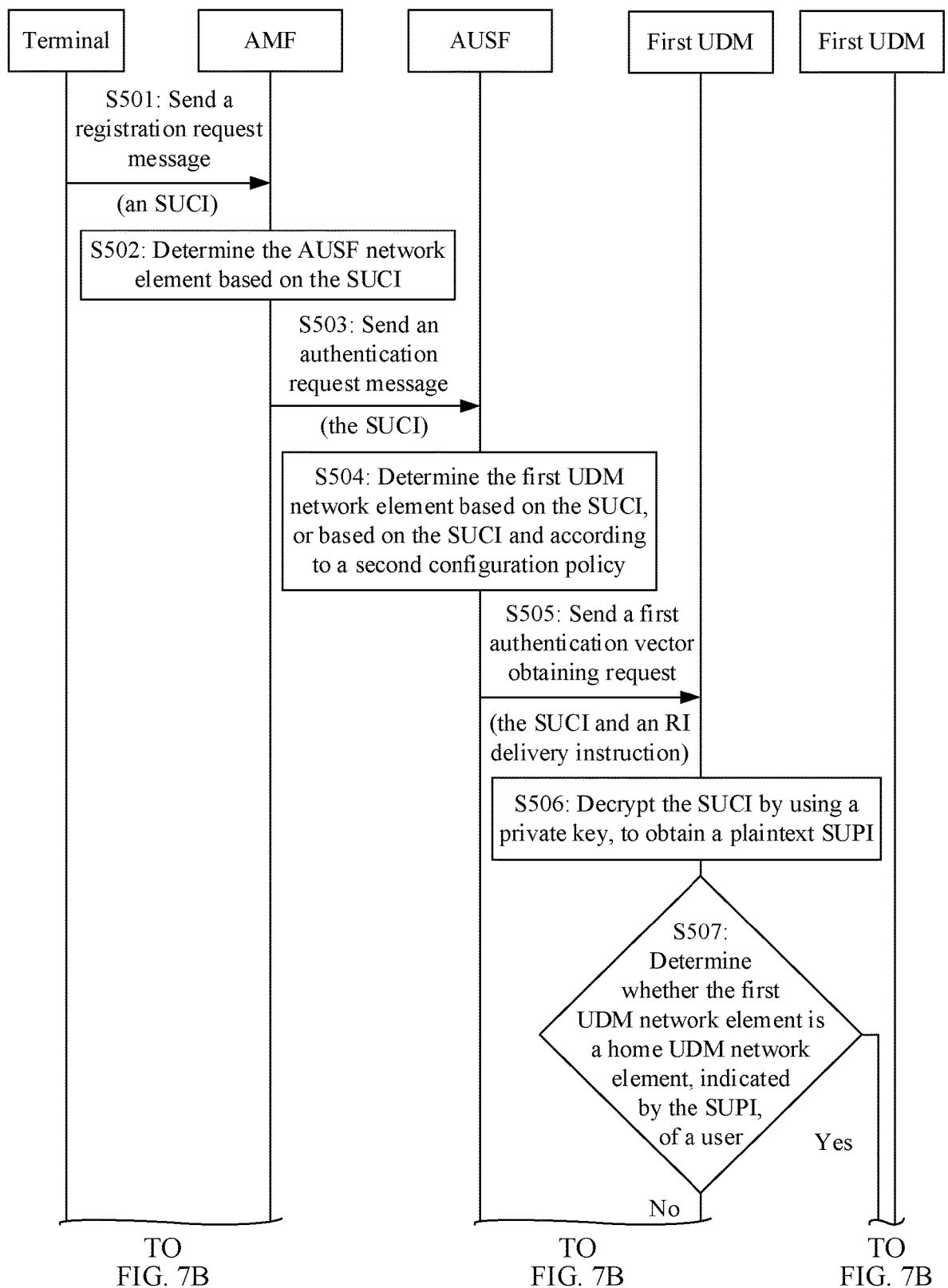
FIG. 7A and FIG. 7B are a flowchart of a routing method according to an embodiment of this application.
Figure 7B:
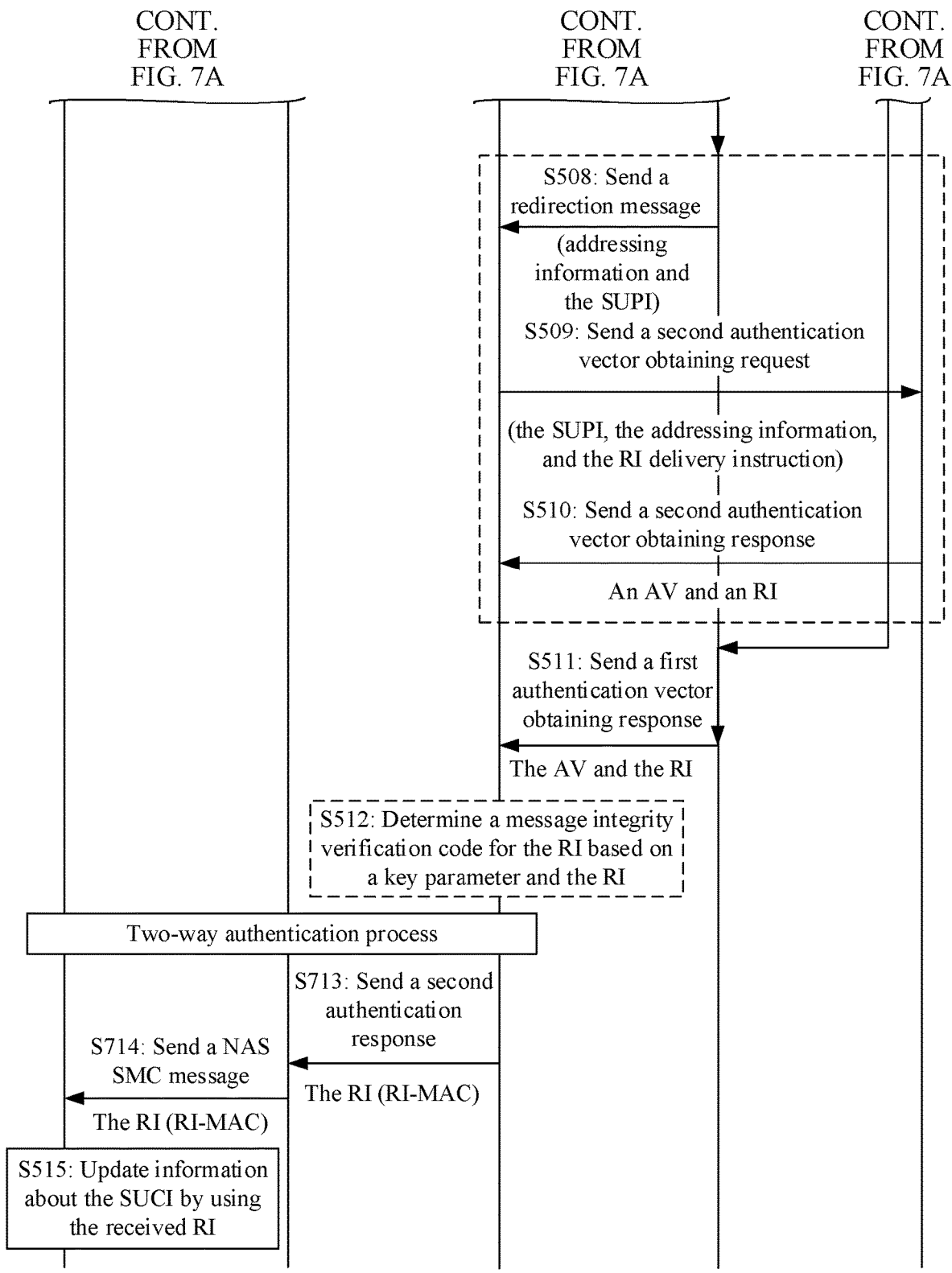

Manner 2: The network side sends the RI to the terminal based on an SMC mechanism. Specifically, as shown in FIG. 7B, S513 and S514 in FIG. 5B may be replaced with S713 and S714.

S713: The AUSF network element sends a second authentication response to the AMF network element.

Correspondingly, the AMF network element receives the second authentication response sent by the AUSF network element.

In a possible implementation, the AUSF network element returns an NAUSF_UEAuthentication_Authenticate Response service response to send the second authentication response to the AMF network element.

The second authentication response carries the RI.

Optionally, the second authentication response carries the RI integrity verification code generated by the AUSF network element in S512. Optionally, the second authentication response carries a counter and a counter-MAC.

S714: The AMF network element sends a NAS SMC message to the terminal.

Correspondingly, the terminal receives the NAS SMC message sent by the AMF network element.

The NAS SMC message carries the RI.

Optionally, the NAS SMC message carries the RI integrity verification code generated by the AUSF network element in S512. Optionally, the NAS SMC message carries a counter and a counter-MAC.

By using the method for adding the RI to the NAS SMC message for transmission, integrity protection can be performed on the RI based on an SMC integrity protection mechanism.

Figure 8A:
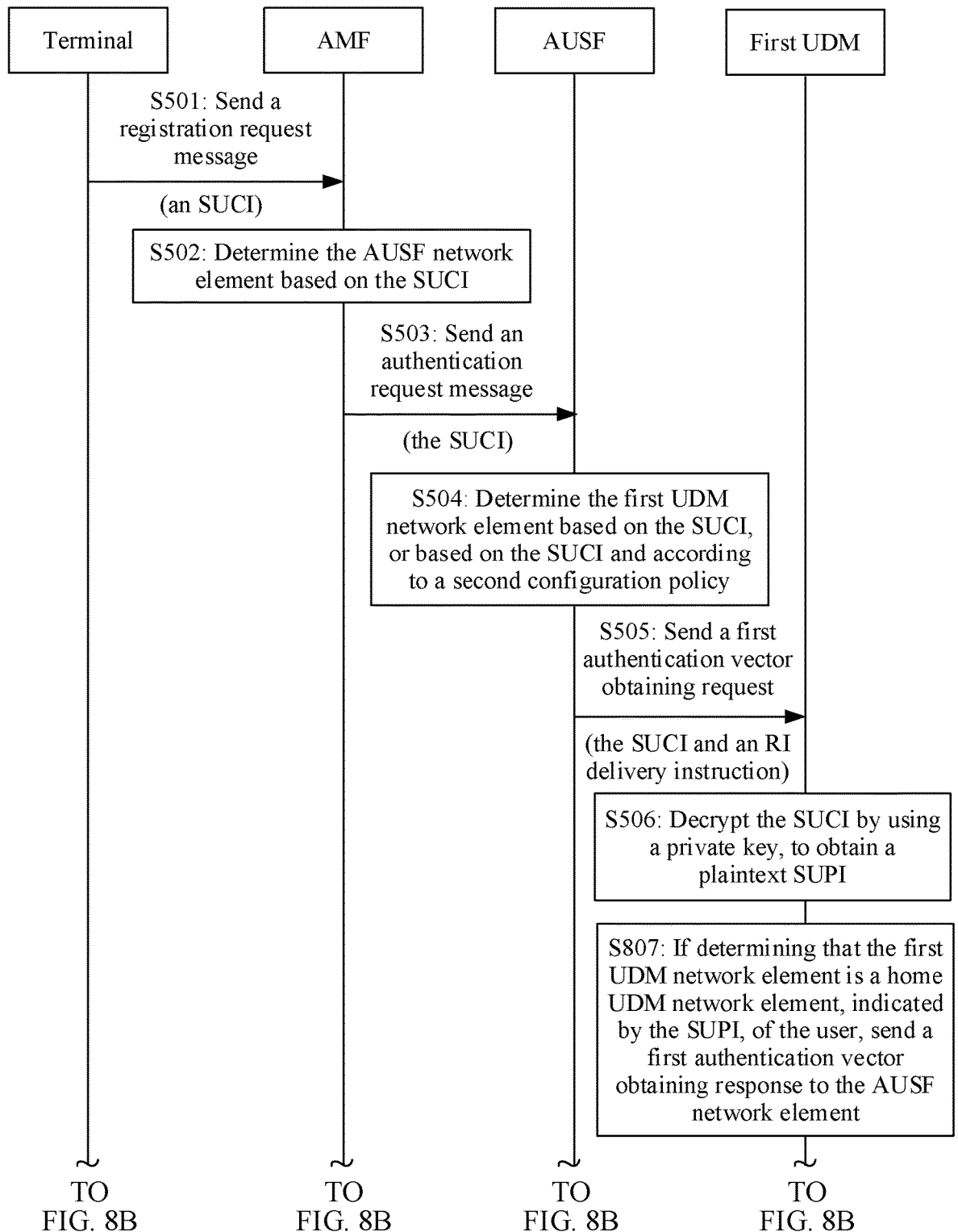
FIG. 8A and FIG. 8B are a flowchart of a routing method according to an embodiment of this application.
Figure 8B:
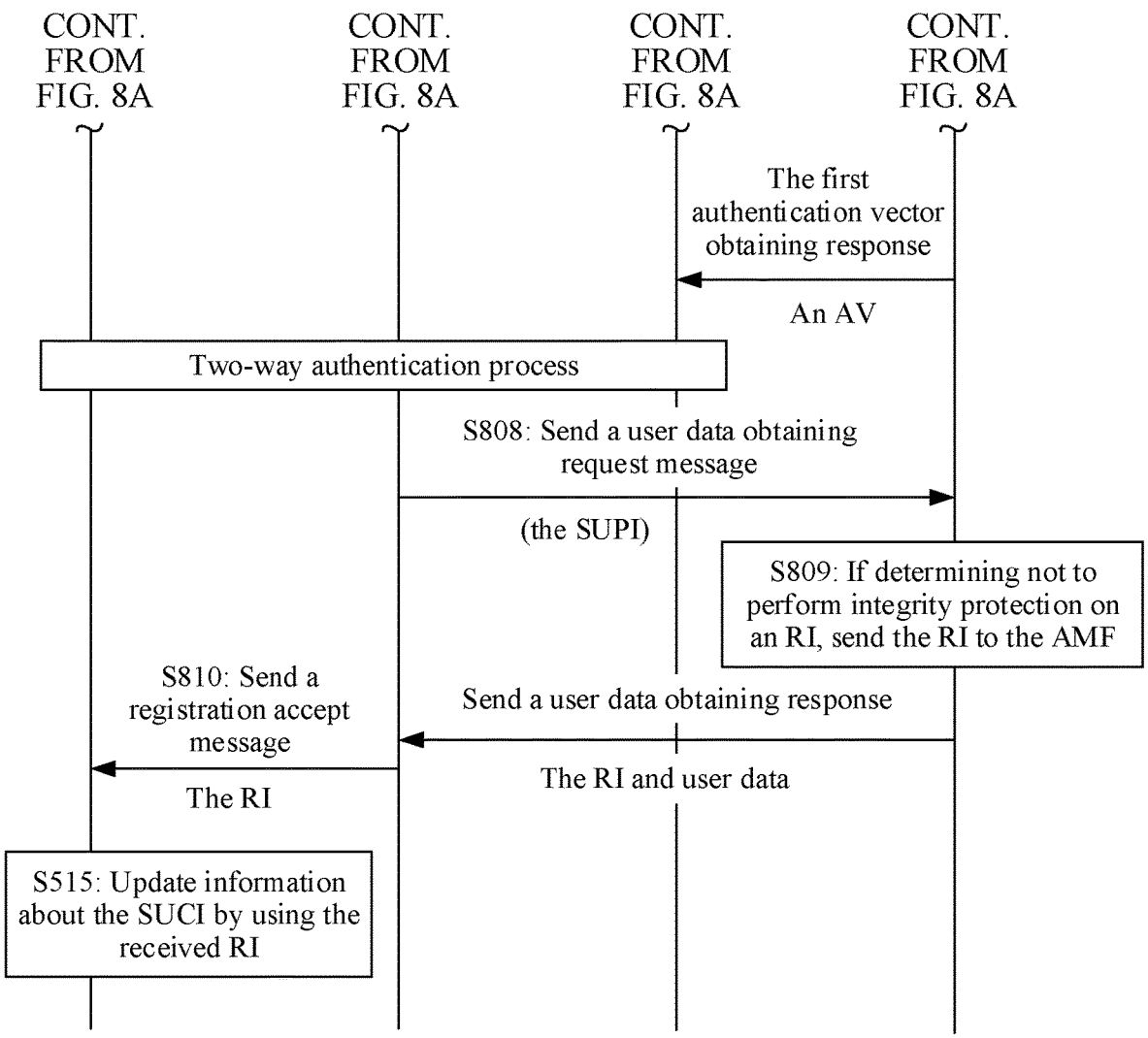

Manner 3: A UDM network element sends the RI to the terminal when sending user subscription data to the terminal. In other words, a condition for triggering the UDM network element to deliver the RI is that the UDM network element receives a user data obtaining request message from the AMF network element. Specifically, an example in which the first UDM network element is the home UDM network element of the user and does not perform integrity protection on the RI is used. As shown in FIG. 8A and FIG. 8B, S507 to S514 in FIG. 5A and FIG. 5B may be replaced with S807 to S810.

S807: If determining that the first UDM network element is the home UDM network element, indicated by the SUPI, of the user, the first UDM network element sends a first authentication vector obtaining response to the AUSF network element.

The first authentication vector obtaining response carries an authentication vector.

Then, two-way authentication is performed between the AUSF network element, the AMF network element, and the terminal according to a specification defined in 3GPP, to ensure authorization of the terminal and the network.

S808: After a two-way authentication procedure is completed, the AMF network element sends a user data obtaining request message to the first UDM network element.

Correspondingly, the first UDM network element receives the user data obtaining request message sent by the AMF network element.

In a possible implementation, the AMF network element invokes an NUDM_SDM_Get Request service of the first UDM network element to send the user data obtaining request message to the first UDM network element.

The user data obtaining request message carries the SUPI.

Optionally, the user data obtaining request message carries an RI integrity protection identifier, used to instruct the first UDM network element whether to perform integrity protection on the RI.

S809: If determining not to perform integrity protection on the RI, the first UDM network element sends a user data obtaining response to the AMF network element.

Correspondingly, the AMF network element receives the user data obtaining response sent by the first UDM network element.

In a possible implementation, the first UDM network element returns an NUDM_SDM_Get Response service response to send the user data obtaining response to the AMF network element.

The user data obtaining response carries the RI and user subscription data. The user subscription data includes, but is not limited to, a consumption package of a universal subscriber identity module (USIM) card of the terminal and a service related to the consumption package.

Optionally, the first UDM network element determines, based on the RI integrity protection identifier carried in the user data obtaining request message, whether to protect the RI. For example, a length of the RI integrity protection identifier is 1 bit. When the RI integrity protection identifier is set to 0, the first UDM network element does not perform integrity protection on the RI. Alternatively, the first UDM network element may determine, according to a preconfigured policy of the first UDM network element, whether to perform integrity protection on the RI. This is not limited in this embodiment of this application. Herein, that the length of the RI integrity protection identifier is 1 bit is merely used as an example. A specific format used for the RI integrity protection identifier, a specific quantity of bits used, and a meaning of each bit are not limited in this embodiment of this application.

S810: The AMF network element sends a registration accept message to the terminal.

The registration accept message carries the RI.

Figure 9A:
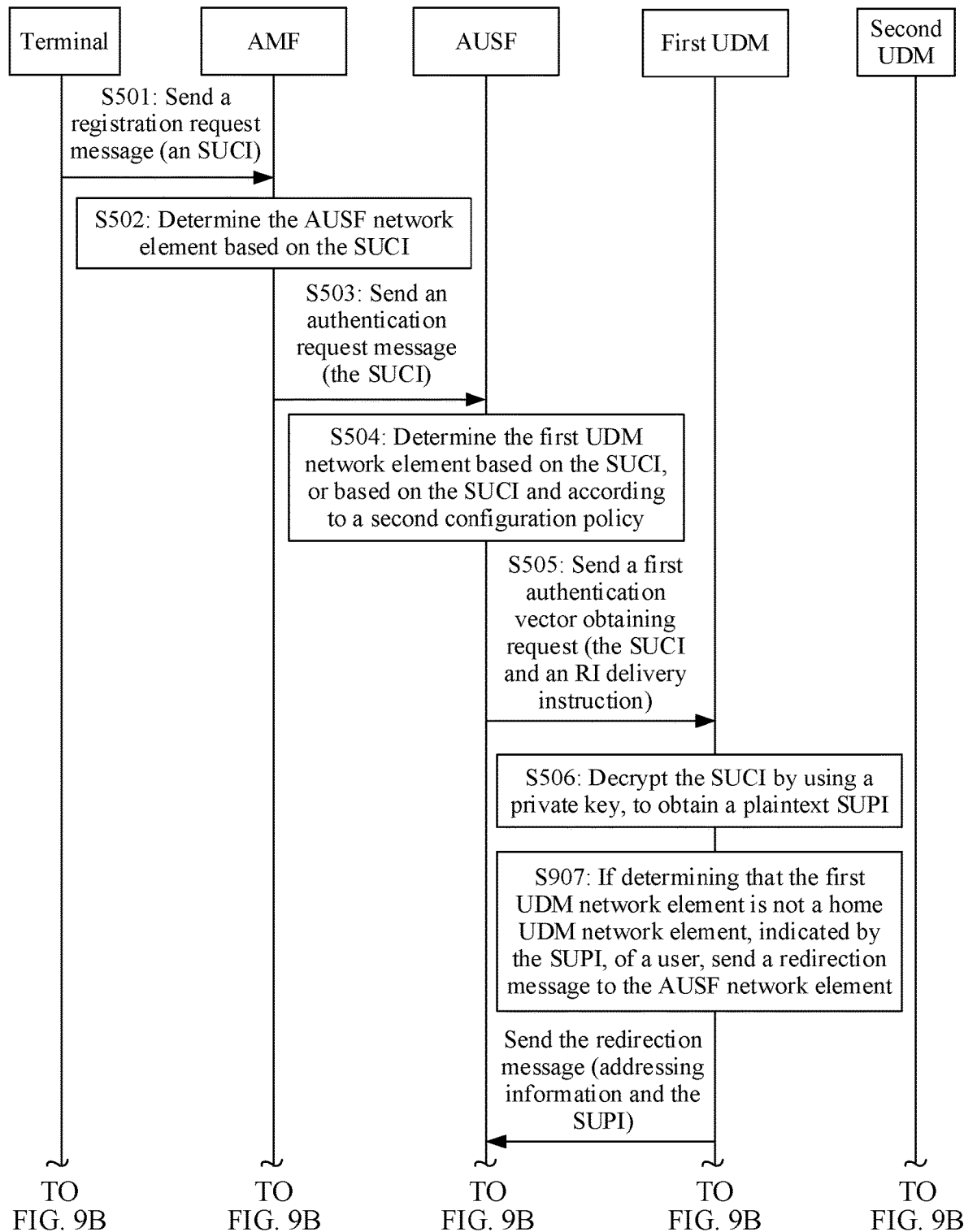
FIG. 9A to FIG. 9C are a flowchart of a routing method according to an embodiment of this application.
Figure 9B:
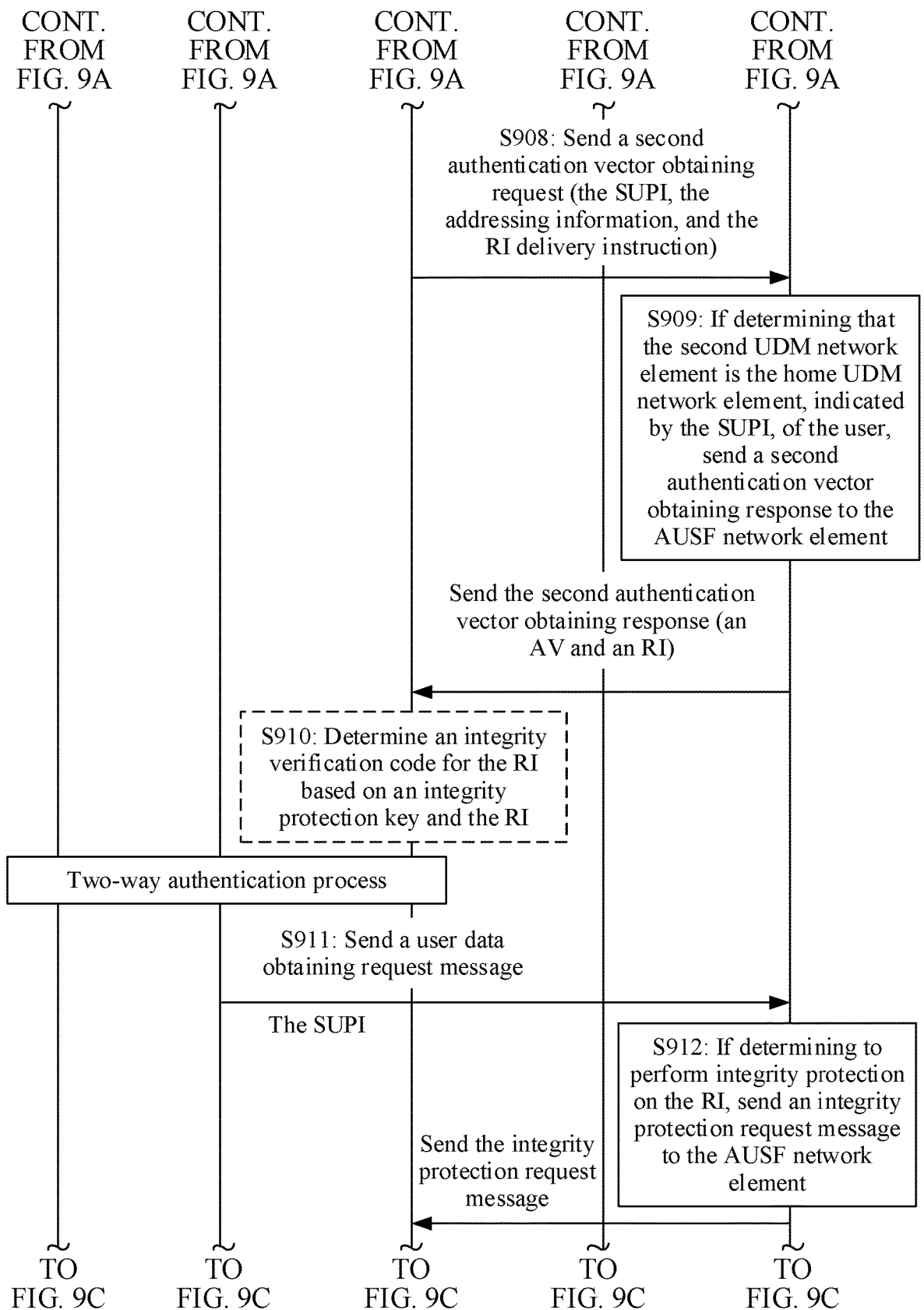
Figure 9C:
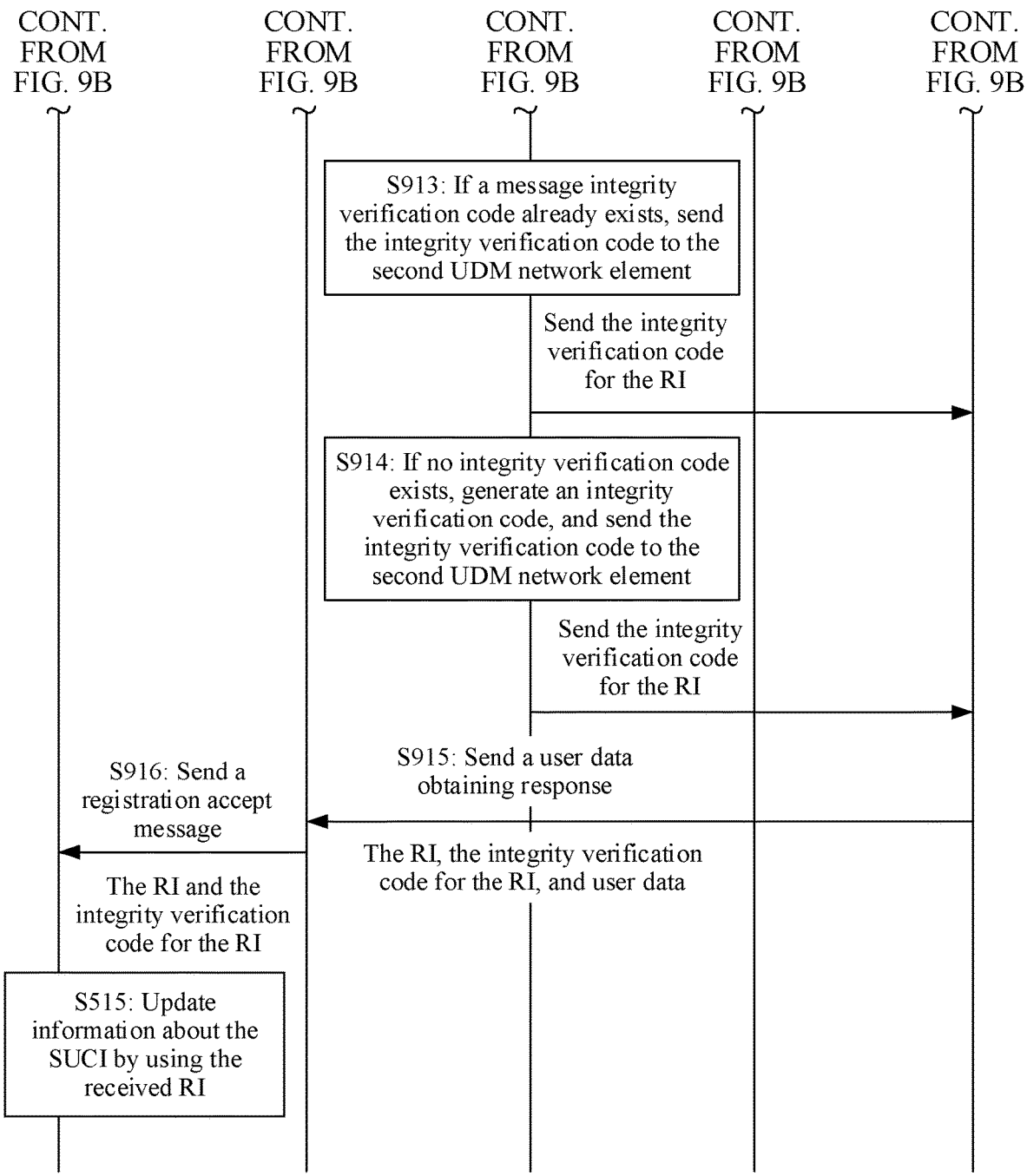

Alternatively, as shown in FIG. 9A to FIG. 9C, in the manner 3, when the second UDM network element is the home UDM network element of the user, and the second UDM network element performs integrity protection on the RI, S507 to S514 in FIG. 5A and FIG. 5B may be specifically replaced with the following steps S907 to S916.

S907: If determining that the first UDM network element is not the home UDM network element, indicated by the SUPI, of the user, the first UDM network element sends a redirection message to the AUSF network element.

S908: The AUSF network element sends a second authentication vector obtaining request to the second UDM network element.

S909: If determining that the second UDM network element is the home UDM network element, indicated by the SUPI, of the user, the second UDM network element sends a second authentication vector obtaining response to the AUSF network element.

The second authentication vector obtaining response carries an authentication vector. Optionally, if an occasion and a condition for triggering the second UDM network element to deliver the RI are that the second UDM network element receives a second authentication vector obtaining request sent by the AUSF network element, the second authentication vector obtaining response further carries the RI. (Optional)

S910. The AUSF network element determines an RI integrity verification code based on an integrity protection key and the RI.

For detailed descriptions of S907 to S910, refer to descriptions of corresponding steps in the procedures in FIG. 5A to FIG. 8B. Details are not described herein again.

S911: The AMF network element sends a user data obtaining request message to the second UDM network element.

Correspondingly, the second UDM network element receives the user data obtaining request message sent by the AMF network element.

In a possible implementation, the AMF network element invokes an NUDM_SDM_Get Request service of the second UDM network element to send the user data obtaining request message to the second UDM network element.

The user data obtaining request message carries the SUPI. Optionally, the user data obtaining request message carries an RI integrity protection identifier.

S912: If determining to perform integrity protection on the RI, the second UDM network element sends an integrity protection request message to the AUSF network element.

Correspondingly, the AUSF network element receives the integrity protection request message sent by the second UDM network element, where the message is used to request the RI integrity verification code.

Optionally, the second UDM network element determines, based on the RI integrity protection identifier carried in the user data obtaining request message, whether to protect the RI. For example, when the RI integrity protection identifier is 1 bit and is 1, the second UDM network element determines to perform integrity protection on the RI. Alternatively, the second UDM network element may determine, according to a preconfigured policy of the second UDM network element, whether to perform integrity protection on the RI. This is not limited in this embodiment of this application.

Optionally, as described above, there are a plurality of possible conditions for triggering the second UDM network element to deliver the RI to the AUSF network element. If a condition for triggering the second UDM network element to deliver the RI to the AUSF network element is that the second UDM network element receives a user data obtaining request message, the second UDM network element adds the RI to the integrity protection request message, where the RI is used for the AUSF network element to generate the RI integrity verification code.

S913: The AUSF network element determines whether an RI integrity verification code has been generated; and if the second authentication vector obtaining response received by the AUSF network element carries the RI, and the AUSF network element has performed S910 to generate the RI integrity verification code, the AUSF network element sends the RI integrity verification code to the second UDM network element.

Optionally, the AUSF network element may further deliver a counter and a counter-MAC to the second UDM network element when sending the RI integrity verification code to the second UDM network element.

S914: If the AUSF network element does not include a generated RI integrity verification code, the AUSF network element generates an RI integrity verification code, and sends the newly generated RI integrity verification code to the second UDM network element.

Optionally, the AUSF network element may further deliver a counter and a counter-MAC to the second UDM network element when sending the RI integrity verification code to the second UDM network element.

In the following two cases, the AUSF network element does not include a generated RI integrity verification code:

1. The second UDM network element does not add the RI to the second authentication vector obtaining response.

2. The second UDM network element adds the RI to the second authentication vector obtaining response, and the AUSF network element receives the RI, but does not generate an RI integrity verification code by using the RI.

S915: The second UDM network element sends a user data obtaining response to the AMF network element, where the user data obtaining response carries the RI and user data. Optionally, the user data obtaining response carries the RI-MAC, the counter, and the counter-MAC.

Correspondingly, the AMF network element receives the user data obtaining response sent by the second UDM network element.

In a possible implementation, the second UDM network element returns an NUDM_SDM_Get Response service response to send the user data obtaining response to the AMF network element.

S916: The AMF network element sends a registration accept message to the terminal.

Correspondingly, the terminal receives the registration accept message sent by the AMF network element.

The registration accept message carries the RI and the RI integrity verification code.

It should be noted that after the network side delivers the RI to the terminal in any one of the foregoing three manners, the terminal may further perform S515.

S515: The terminal updates information about the SUCI by using the received RI.

There are two cases in which the terminal updates the information about the SUCI in S515.

Case 1: If integrity protection is not performed on the RI received by the terminal, the terminal directly updates the information about the SUCI by using the RI.

Usually, the terminal includes a mobile equipment (ME) module and a USIM card. The ME is configured to provide an application and a service, and the USIM is configured to provide user identity identification. Correspondingly, the terminal may write an updated RI into the ME or the USIM card. Specifically, the terminal invokes a read/write interface to update an RI bit included in an SUCI in the USIM card or the ME to the received RI.

Case 2: If receiving the integrity verification code corresponding to the RI, the terminal performs integrity verification on the RI by using the RI integrity verification code, and after the integrity verification on the RI succeeds, the terminal updates the information about the SUCI by using the RI. Specifically, the terminal performs a reverse operation of the generating the RI integrity verification code: generating an integrity protection key by using KAUSF and a key parameter, and then calculating an X-MAC by using the generated integrity protection key and the received RI. If the X-MAC is consistent with a value of the RI-MAC received by the terminal, it indicates that the RI is not tampered with by a third party, and the terminal updates the information about the SUCI by using the RI. The key parameter used by the terminal is the same as the key parameter used by the AUSF network element to generate the RI integrity verification code. To be specific, if the AUSF network element generates the integrity protection key by using KAUSF and the random number in the authentication vector, when the terminal verifies whether the RI is tampered with by a third party, the terminal also generates the integrity protection key by using the random number in the authentication vector and KAUSF in the terminal; or if the AUSF network element generates the integrity protection key by using KAUSF and the counter value, the terminal also calculates the integrity protection key by using KAUSF and the counter value received from the AUSF network element.

Optionally, when receiving the counter-MAC, the terminal performs integrity verification on the counter. If the verification succeeds, it indicates that the counter is not tampered with. In this case, if the terminal finds that the counter value is greater than a counter value locally stored in the terminal, it indicates that the counter received by the terminal is newly delivered by the network side, and the terminal further performs integrity verification on the RI. After the integrity verification on the RI succeeds, the terminal updates the information about the SUCI by using the RI. Correspondingly, the terminal updates the local counter value.

According to the routing method provided in this embodiment of this application, the AUSF network element sends the first authentication vector obtaining request to the first UDM network element, and if receiving the RI sent by the first UDM network element, the AUSF network element sends the RI to the AMF network element. Subsequently, the AMF network element that manages the terminal delivers the RI to the terminal, so that the terminal can update the RI of the terminal, and the terminal can address a correct UDM network element when accessing the network for authentication.

It should be noted that in this embodiment of this application, a plurality of pieces of information sent and received between network elements may be carried in one message for transmission, or may be carried in different messages for transmission. This is not limited in this embodiment of this application.

Figure 10A:
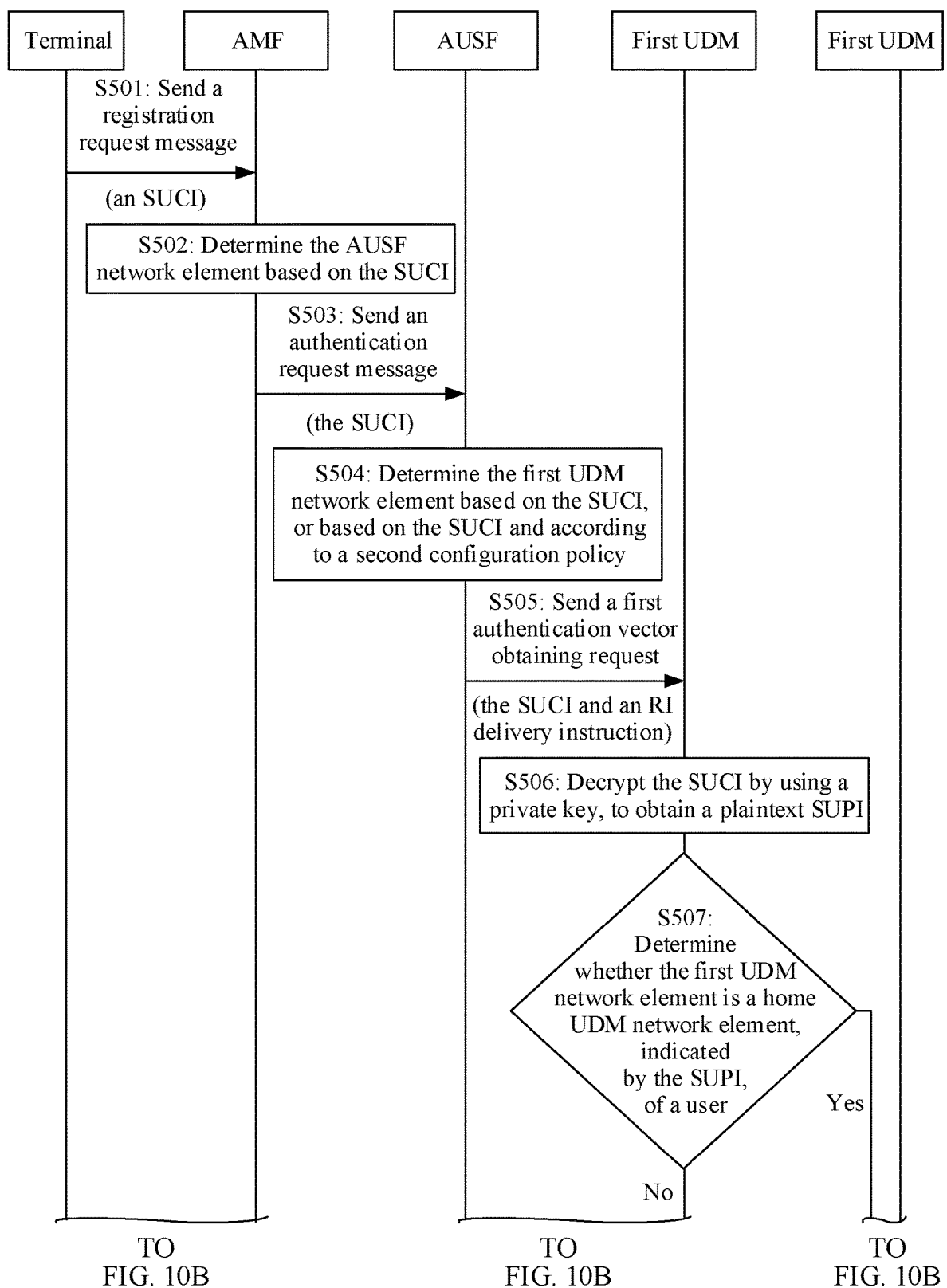
FIG. 10A and FIG. 10B are a flowchart of a routing method according to an embodiment of this application.
Figure 10B:
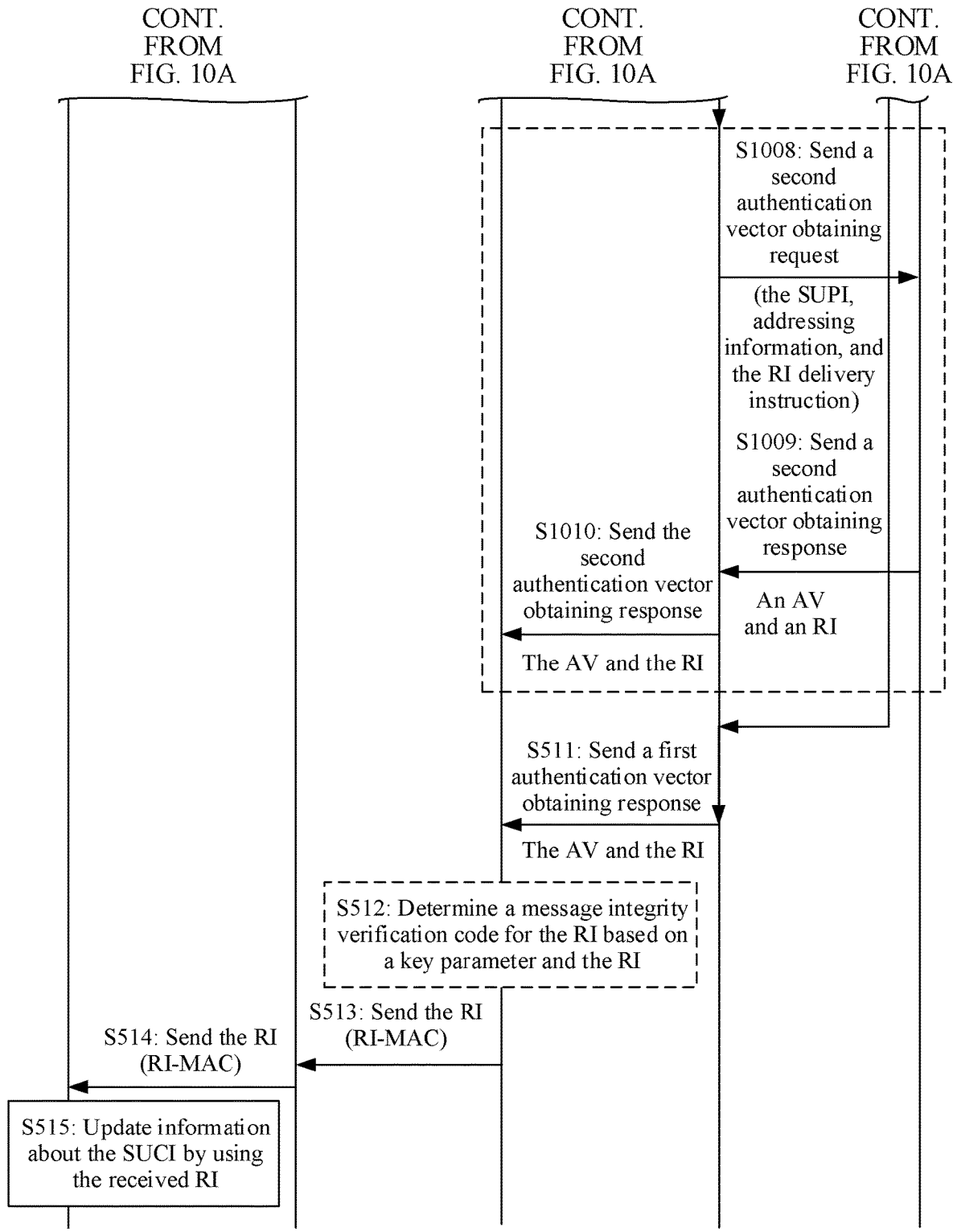

An embodiment of this application further provides another routing method. When the first UDM network element receives the first authentication vector obtaining request and determines that the first UDM network element is not the home UDM network element of the user, the first UDM network element may further send a second authentication vector obtaining request to the second UDM network element. Specifically, as shown in FIG. 10B, S508 to S510 may be replaced with the following steps.

S1008: The first UDM network element sends a second authentication vector obtaining request to the second UDM network element.

In a possible implementation, the first UDM network element invokes an NUDM_UEAuthentication_Get Request service of the second UDM network element to send the second authentication vector obtaining request to the second UDM network element.

S1009: The second UDM network element sends a second authentication vector obtaining response to the first UDM network element.

In a possible implementation, the second UDM network element returns an NUDM_UEAuthentication_Get Response service response to send the second authentication vector obtaining response to the first UDM network element.

S1010: The first UDM network element sends the second authentication vector obtaining response to the AUSF network element.

In a possible implementation, the first UDM network element returns an NUDM_UEAuthentication_Get Response service response to send the second authentication vector obtaining response to the AUSF network element.

For detailed descriptions of the second authentication vector obtaining request and the second authentication vector obtaining response, refer to the foregoing descriptions. Details are not described herein again.

By using the routing method, the first UDM network element may determine a second UDM network element, and directly send a second authentication vector obtaining request to the second UDM network element, without intermediate forwarding or processing by another network element, thereby reducing a transmission delay between network elements.

Figure 11:
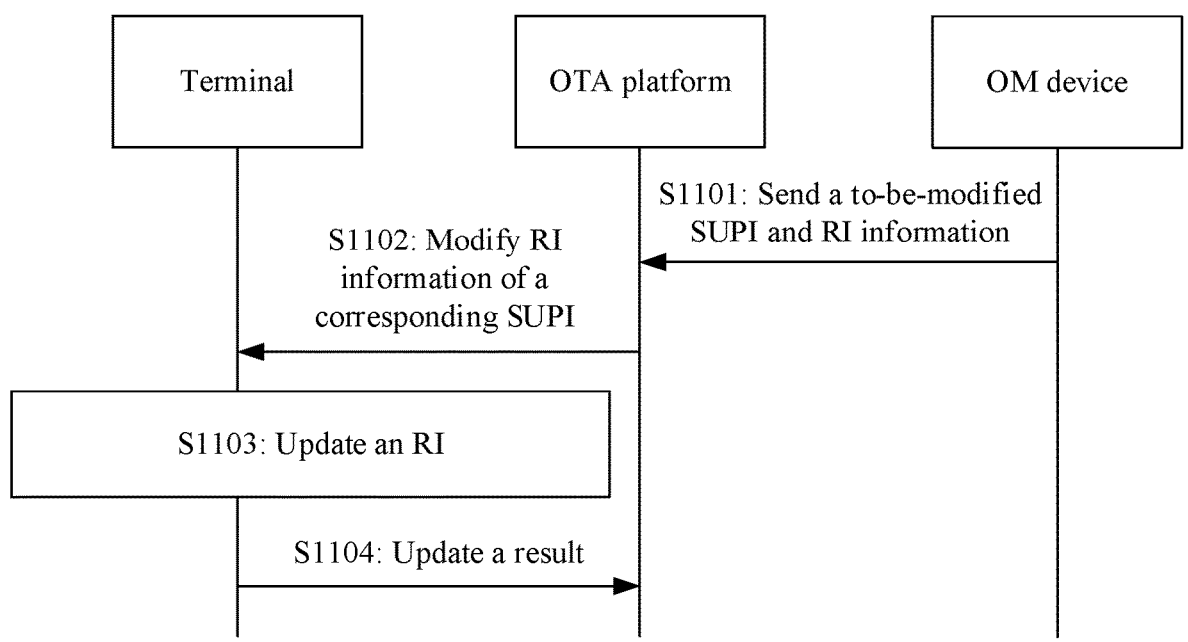
FIG. 11 is a flowchart of a routing method according to an embodiment of this application.

An embodiment of this application further provides another routing method, applied to an over-the-air (OTA) platform. As shown in FIG. 11, the method includes the following steps.

S1101: An operation & maintenance (OM) device sends a to-be-modified SUPI and RI to the OTA platform.

S1102: The OTA platform modifies RI information of a corresponding SUPI.

For example, the OTA platform sends an SMC message to a terminal, where the SMC message is used to instruct the terminal to update an RI.

S1103: The terminal updates the RI.

S1104: The terminal sends an update result to the OTA platform.

An embodiment of this application further provides a routing method. A user initially registers with a first UDM network element, and the user is subsequently migrated to a second UDM network element due to a service requirement. In this scenario, the first UDM network element actively initiates an RI update procedure.

For example, if determining that RI information of a terminal needs to be modified, the first UDM network element sends a modified RI to an AMF network element. Optionally, before sending the modified RI to the AMF network element, the first UDM network element may further perform integrity protection on the modified RI.

Figure 12:
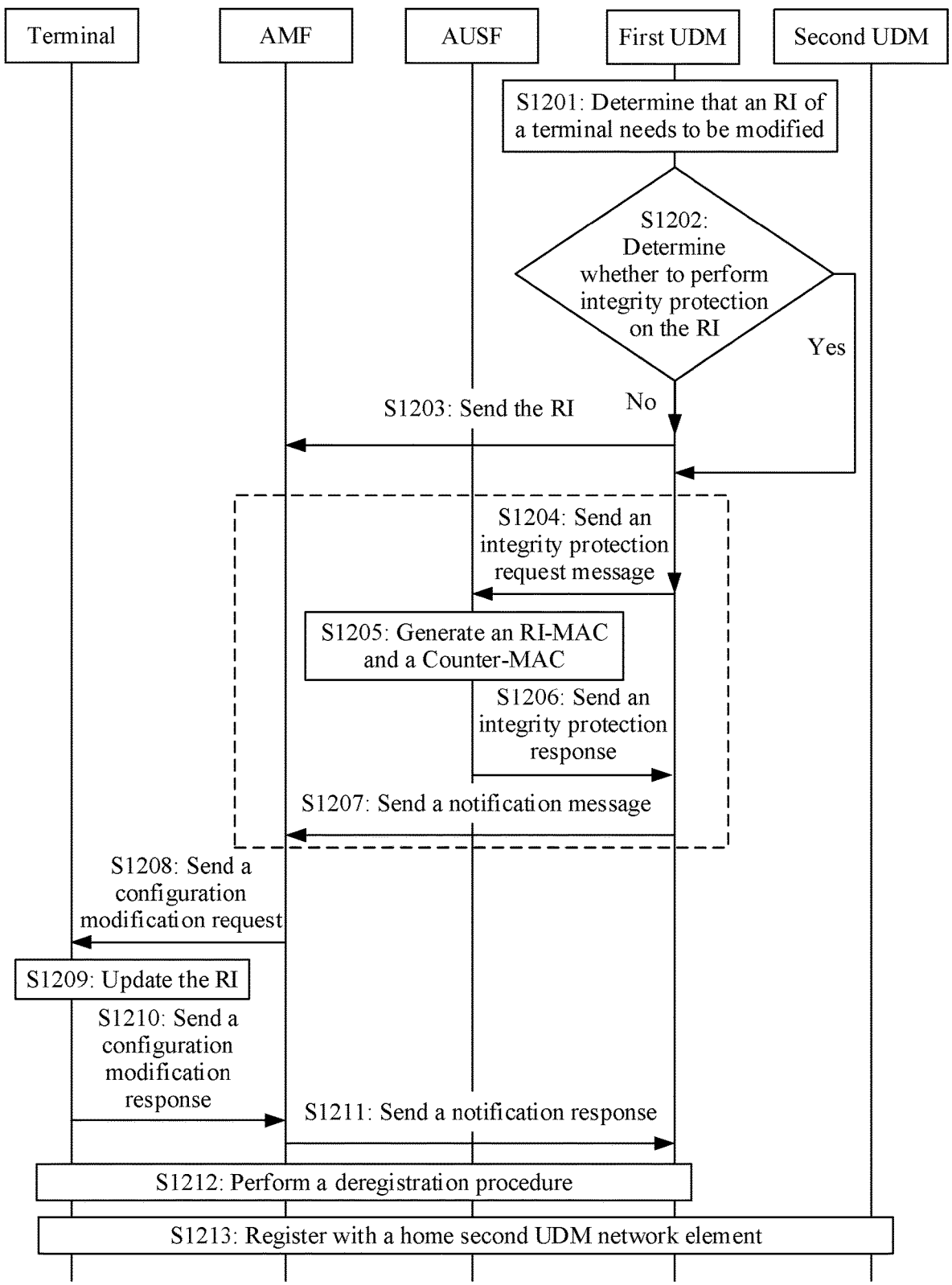
FIG. 12 is a flowchart of a routing method according to an embodiment of this application.

Specifically, as shown in FIG. 12, the method includes the following steps.

S1201: The first UDM network element determines that the RI information of the terminal needs to be modified for a reason, for example, UDM adjustment of the user causes an RI modification.

S1202: The first UDM network element determines, according to a local policy, whether to perform integrity protection on an RI; and if not, performs S1203; or if yes, performs S1204.

S1203: The first UDM network element sends the RI to the AMF network element.

Correspondingly, the AMF network element receives the RI sent by the first UDM network element.

S1204: The first UDM network element sends an integrity protection request message to an AUSF network element.

Correspondingly, the AUSF network element receives the integrity protection request message sent by the first UDM network element.

The integrity protection request message carries an RI corresponding to the second UDM network element.

S1205: The AUSF network element generates an RI-MAC based on an integrity protection key and the RI corresponding to the second UDM network element, and optionally, generates a counter-MAC based on a counter and the integrity protection key.

S1206: The AUSF network element sends an integrity protection response to the first UDM network element.

Correspondingly, the first UDM network element receives the integrity protection response sent by the AUSF network element.

The integrity protection response carries the RI-MAC, the counter (optional), and the counter-MAC (optional).

S1207: The first UDM network element sends a notification message to the AMF network element.

Correspondingly, the AMF network element receives the notification message sent by the first UDM network element.

In a possible implementation, the first UDM network element sends the notification message to the AMF network element by using an NUDM_SDM_Notification Request service.

The notification message carries the RI, the RI-MAC (optional), the counter (optional), and the counter-MAC (optional).

S1208: The AMF network element sends a configuration modification request to the terminal.

Correspondingly, the terminal receives the configuration modification request sent by the AMF network element.

The configuration modification request carries the RI, the RI-MAC (optional), the counter (optional), and the counter-MAC (optional).

S1209: The terminal updates an RI.

Optionally, if receiving an RI-MAC corresponding to the RI, the terminal performs integrity verification on the RI-MAC, and after the verification succeeds, the terminal updates the RI.

Optionally, if receiving the counter and the counter-MAC, the terminal first performs integrity verification on the counter-MAC, to confirm that a received counter value is greater than a locally stored counter value. After the verification succeeds, the terminal performs integrity verification on the RI-MAC, to finally confirm that a value of the RI is not tampered with.

S1210: The terminal sends a configuration modification response to the AMF network element.

Correspondingly, the AMF network element receives the configuration modification response sent by the terminal.

S1211: The AMF network element sends a notification response to the first UDM network element.

Correspondingly, the first UDM network element receives the notification response sent by the AMF network element.

In a possible implementation, the AMF network element returns an NUDM_SDM_Notification Response service response to send the notification response to the first UDM network element.

The notification response is used to notify the first UDM network element that the RI of the terminal is successfully updated.

S1212: Perform a deregistration procedure between the terminal and the first UDM network element.

After updating the RI, optionally, the terminal actively initiates a deregistration procedure to the first UDM network element.

Alternatively, in another optional implementation, in S1212, the first UDM network element may initiate a deregistration procedure. Specifically, the first UDM network element sends a re-registration notification message to the AMF network element by using an NUDM_UECM_Deregistration Notification service. The AMF network element sends a Deregistration Request message deregistration request message to the terminal. A cause value carried in the deregistration request message is an RI change. The terminal receives the deregistration request message carrying the cause value of the RI change, and deregisters from the first UDM network element.

S1213: The terminal registers with the home second UDM network element by using the updated RI.

The terminal sends a registration request message to the second UDM network element, to request to register with the second UDM network element. The registration request message carries the RI corresponding to the second UDM network element. For a specific procedure in which the terminal registers with the UDM network element by initiating the registration request message, refer to the prior art. Details are not described in this embodiment of this application.

The method procedure in FIG. 12 includes steps similar to the method procedures shown in FIG. 5A to FIG. 11. For detailed descriptions of these steps, refer to the foregoing descriptions. Details are not described herein again.

In addition, in another embodiment of the present invention, a method for updating a parameter in a terminal is provided.

It can be understood that a terminal includes an ME (Mobile Equipment, mobile terminal) and a USIM. Update parameters mainly include two types: a USIM parameter (namely, a parameter that needs to be updated in the USIM) and an ME parameter (namely, a parameter that needs to be updated in the ME).

The USIM parameter is at least one of parameters such as RI information, a slice selection parameter, a slice ID, a public key identifier, a public key parameter, NSSAI (network slice selection assistance information), S-NSSAI (single-network slice selection assistance information), configured NSSAI (configured network slice selection assistance information), requested NSSAI (requested network slice selection assistance information), a closed access group identifier, a closed group identifier, a closed user group identifier, a group identifier, a user group identifier, and a network group identifier.

The ME parameter is at least one of parameters such as RI information, a slice selection parameter, a slice ID, a public key identifier, a public key parameter, NSSAI, S-NSSAI, configured NSSAI, requested NSSAI, a closed access group identifier, a closed group identifier, a closed user group identifier, a group identifier, a user group identifier, or a network group identifier.

In addition, it should be further noted that a reason for updating the parameter in the terminal may be that UDM adjustment of a user causes a modification of the parameter in the USIM card and/or the parameter in the ME.

Specifically, the method for updating a parameter in a terminal includes the following steps.

S1301: A first UDM network element sends a first notification message to an AMF network element.

Correspondingly, the AMF network element receives the notification message sent by the first UDM network element.

In a possible implementation, the first UDM network element sends the notification message to the AMF network element by using an NUDM_SDM_Notification Request service.

Optionally, the first notification message includes an update parameter (the USIM parameter and/or the ME parameter).

Optionally, the first notification message includes the USIM parameter and a first security parameter. It should be noted that the first security parameter is calculated by the first UDM network element based on the USIM parameter and a key shared by the first UDM network element and the USIM. The shared key may be an initially configured key or a key generated during authentication, for example, at least one of an OTA (over the air) key, an authentication root key, a CK (cipher key), an IK (integrity key), an MSK (master session key), an EMSK (extended master session key), and the like. The first security parameter may include a USIM parameter and a USIM check parameter. The USIM check parameter is used for the USIM to check correctness of the USIM parameter in the first security parameter.

S1302: The AMF network element sends a second notification message to the terminal.

The second notification message may be a downlink NAS message.

The second notification message carries the update parameter, the first security parameter, an update-MAC (optional), and a counter (optional).

S1303: The terminal receives the second notification message.

S1304: The terminal updates the parameter in the terminal based on the second notification message.

In addition, optionally, before the step S1301, the method further includes: interacting, by the first UDM network element, with an AUSF network element to obtain an update-MAC. The update-MAC is used to perform integrity protection on the USIM parameter.

Specifically, the interacting, by the first UDM network element, with an AUSF network element to obtain an update-MAC includes S1305 to S1307.

S1305: The first UDM network element sends a protection request message to the AUSF network element.

Correspondingly, the AUSF network element receives the protection request message sent by the first UDM network element.

Optionally, the protection request message carries the USIM parameter.

Optionally, the protection request message carries the USIM parameter and the first security parameter.

Optionally, the protection request message carries the first security parameter.

Optionally, the protection request message may further include an expected USIM card response.

Optionally, the protection request message may further include an expected UE response.

S1306: The AUSF network element generates the update-MAC based on the protection request message.

Optionally, the AUSF network element generates the update-MAC based on the USIM parameter and the first security parameter.

Optionally, the AUSF network element generates the update-MAC based on the first security parameter.

Optionally, the AUSF network element generates the update-MAC based on a counter (a count value stored in the AUSF network element), the USIM parameter, and the first security parameter.

Optionally, the AUSF network element generates the update-MAC based on a protection key, a counter (a count value stored in the AUSF network element), the USIM parameter, and the first security parameter.

Optionally, the AUSF network element generates the update-MAC based on a counter (a count value stored in the AUSF network element) and the first security parameter.

Optionally, the AUSF network element generates the update-MAC based on a protection key, a counter (a count value stored in the AUSF network element), and the first security parameter.

The protection key is a key shared by the UE and the AUSF network element. The protection key herein may be an initially configured key or a key generated during authentication, for example, a KAUSF key.

Optionally, the AUSF network element generates a counter-MAC based on the counter and the protection key. The counter-MAC is used to perform integrity protection on the counter. In addition, it should be noted that calculation parameter input of the counter-MAC may further include the expected USIM response. The calculation parameter input of the counter-MAC may further include the expected UE response.

S1307: The AUSF network element sends a protection response to the first UDM network element.

Correspondingly, the first UDM network element receives the protection response sent by the AUSF network element.

The protection response carries the update-MAC.

Optionally, the protection response may further include the counter and/or the counter-MAC.

Correspondingly, after receiving the protection response, the first UDM network element adds the update-MAC to the first notification message sent to the AMF network element. Certainly, the first notification message may further include the counter received from the AUSF network element. It can be understood that if the first notification message received by the AMF network element includes the update-MAC and/or the counter, the AMF network element adds these parameters to the second notification message, and sends the second notification message to the terminal. Certainly, the AMF network element may alternatively send the received parameters to the terminal by using another message.

Correspondingly, if receiving the update-MAC, the terminal performs integrity verification on the update-MAC, and updates the USIM parameter after the verification succeeds.

Optionally, the updating the USIM parameter includes: sending, by the terminal, the received USIM parameter to the USIM card, so that the USIM updates an internal parameter based on the USIM parameter.

Optionally, the updating the USIM parameter includes: sending, by the terminal, the first security parameter to the USIM card; and performing, by the USIM card, verification on the first security parameter, and after the verification succeeds, sending a response message including a USIM card response to the ME. Certainly, after successfully verifying the first security parameter, the USIM card updates the parameter in the USIM card.

Optionally, an integrity verification manner may be as follows. If receiving the counter, the terminal first checks the counter, to confirm that a received counter value is greater than a locally stored counter value. After verification succeeds, the terminal calculates a UE-update-MAC on the terminal side in a same calculation manner as that of the AUSF network element. If the UE-update-MAC is the same as the received update-MAC, verification succeeds, and it is finally confirmed that the update parameter and the first security parameter are not tampered with.

Optionally, an integrity verification manner may be as follows. The terminal calculates a UE-update-MAC on the terminal side in a same calculation manner as that of the AUSF network element. If the UE-update-MAC is the same as the received update-MAC, verification succeeds, and it is finally confirmed that the update parameter and the first security parameter are not tampered with.

Further, optionally, after updating the USIM parameter, the terminal performs feedback to the first UDM network element. Specifically, a method for the feedback specifically includes steps S1308 to S1310.

S1308: The terminal sends a first feedback message to the AMF network element.

The first feedback message may be an uplink NAS message.

Correspondingly, the AMF network element receives the uplink NAS message sent by the terminal.

The message includes a UE-counter-MAC, and the UE-counter-MAC is used to perform integrity protection on the count value received by the UE side. Optionally, the message further includes a USIM response, and optionally, further includes a UE response.

The UE-counter-MAC is generated based on a protection key and the received counter. Optionally, the USIM card response and/or the UE response are/is also optional parameters for generating the UE-counter-MAC.

S1309: The AMF network element sends a second feedback message to the first UDM network element.

Correspondingly, the first UDM network element receives the notification response sent by the AMF network element.

The message includes the UE-counter-MAC; optionally, further includes the USIM response; and optionally, further includes the UE response.

In a possible implementation, the AMF network element returns an NUDM_SDM_Notification Response service response to send the notification response to the first UDM network element.

S1310: The first UDM network element receives the notification message sent by the AMF network element.

The first UDM network element checks whether the received UE-counter-MAC is the same as the counter-MAC received from the AUSF network element. If they are the same, it indicates that the UE has updated the update parameter and the first security parameter.

In the foregoing procedure, a calculation function for the update-MAC, the UE-update-MAC, the counter-MAC, and the UE-counter-MAC may be any message verification code function, for example, a key-related hash operation message authentication code or a key derivation function. This is not limited. The foregoing procedure is described by using the USIM as an example. Alternatively, another UICC may be used. This is not limited.

In addition, in another embodiment of the present invention, a method for updating a parameter in a terminal is provided.

It can be understood that a terminal includes an ME (Mobile Equipment, mobile terminal) and a USIM. Update parameters mainly include two types: a USIM parameter (namely, a parameter that needs to be updated in the USIM) and an ME parameter (namely, a parameter that needs to be updated in the ME).

The USIM parameter is at least one of parameters such as RI information, a slice selection parameter, a slice ID, a public key identifier, a public key parameter, NSSAI, S-NSSAI, configured NSSAI, requested NSSAI, a closed access group identifier, a closed group identifier, a closed user group identifier, a group identifier, a user group identifier, or a network group identifier.

The ME parameter is at least one of parameters such as RI information, a slice selection parameter, a slice ID, a public key identifier, a public key parameter, NSSAI, S-NSSAI, configured NSSAI, requested NSSAI, a closed access group identifier, a closed group identifier, a closed user group identifier, a group identifier, a user group identifier, or a network group identifier.

In addition, it should be further noted that a reason for updating the parameter in the terminal may be that UDM adjustment of a user causes a modification of the parameter in the USIM card and/or the parameter in the ME.

Specifically, the method for updating a parameter in a terminal includes the following steps.

S1401: A first UDM network element sends a first notification message to an AMF network element.

Correspondingly, the AMF network element receives the notification message sent by the first UDM network element.

In a possible implementation, the first UDM network element sends the notification message to the AMF network element by using an NUDM_SDM_Notification Request service.

Optionally, the first notification message includes an update parameter (the USIM parameter and/or the ME parameter).

Optionally, the first notification message includes an update parameter and a first security parameter. It should be noted that the first security parameter is calculated by the first UDM network element based on the USIM parameter and a key shared by the first UDM network element and the USIM. The shared key may be an initially configured key or a key generated during authentication, for example, at least one of an OTA key, an authentication root key, a CK, an IK, an MSK, an EMSK, and the like. The first security parameter may include a USIM parameter and a USIM check parameter. The USIM check parameter is used for the USIM to check correctness of the USIM parameter in the first security parameter.

S1402: The AMF network element sends a second notification message to the terminal.

The second notification message may be a downlink NAS message.

The second notification message carries the update parameter, the first security parameter (optional), an update-MAC (optional), and a counter (optional).

S1403: The terminal receives the second notification message.

S1404: The terminal updates the parameter in the terminal based on the second notification message.

In addition, optionally, before the step S1301, the method further includes: interacting, by the first UDM network element, with an AUSF network element to obtain an update-MAC. The update-MAC is used to perform integrity protection on the update parameter.

Specifically, the interacting, by the first UDM network element, with an AUSF network element to obtain an update-MAC includes S1405 to S1407.

S1405: The first UDM network element sends a protection request message to the AUSF network element.

Correspondingly, the AUSF network element receives the protection request message sent by the first UDM network element.

Optionally, if the update parameter includes the USIM parameter, the first UDM network element first calculates the first security parameter based on the USIM parameter and the key shared by the first UDM network element and the USIM. The security parameter 1 may include a USIM parameter and a USIM check parameter. The USIM check parameter is used for the USIM to check correctness of the USIM parameter in the security parameter.

Optionally, the protection request message carries the update parameter and the first security parameter.

Optionally, the protection request message carries the update parameter.

Optionally, the protection request message may further include an expected USIM card response.

Optionally, the protection request message may further include an expected UE response.

S1406: The AUSF network element generates the update-MAC based on the protection request message.

Optionally, the AUSF network element generates the update-MAC based on the update parameter and/or the first security parameter.

Optionally, the AUSF network element generates the update-MAC based on a protection key, a counter (a count value stored in the AUSF network element), and the update parameter.

Optionally, the AUSF network element generates the update-MAC based on a protection key, a counter (a count value stored in the AUSF network element), the update parameter, and the first security parameter.

The protection key is a key shared by the UE and the AUSF network element. The protection key herein may be an initially configured key or a key generated during authentication, for example, a KAUSF key.

Optionally, the AUSF network element generates a counter-MAC based on the counter and the protection key. The counter-MAC is used to perform integrity protection on the counter. In addition, it should be noted that calculation parameter input of the counter-MAC may further include the expected USIM response. The calculation parameter input of the counter-MAC may further include the expected UE response.

S1407: The AUSF network element sends a protection response to the first UDM network element.

Correspondingly, the first UDM network element receives the protection response sent by the AUSF network element.

The protection response carries the update-MAC.

Optionally, the protection response may further include the counter and/or the counter-MAC.

Correspondingly, after receiving the protection response, the first UDM network element adds the update-MAC to the first notification message sent to the AMF network element. Certainly, the first notification message may further include the counter received from the AUSF network element. It can be understood that if the first notification message received by the AMF network element includes the update-MAC and/or the counter, the AMF network element adds these parameters to the second notification message, and sends the second notification message to the terminal. Certainly, the AMF network element may alternatively send the received parameters to the terminal by using another message.

Correspondingly, if receiving the update-MAC, the terminal performs integrity verification on the update-MAC, and updates the update parameter after the verification succeeds.

The terminal updates, based on the ME parameter in the received update parameter, a corresponding parameter stored in the ME. If the second notification message further includes the first security parameter, the first security parameter is sent to the USIM in the terminal.

Optionally, the updating the USIM parameter includes: sending, by the terminal, the received USIM parameter to the USIM card, so that the USIM updates an internal parameter based on the USIM parameter. Then the USIM card sends a response message including a USIM card response to the ME.

Optionally, the updating the USIM parameter includes: sending, by the terminal, the first security parameter to the USIM card; and performing, by the USIM card, verification on the first security parameter, and after the verification succeeds, sending a response message including a USIM card response to the ME. Certainly, after successfully verifying the first security parameter, the USIM card updates the parameter in the USIM card.

Optionally, an integrity verification manner may be as follows. If receiving the counter, the terminal first checks the counter, to confirm that a received counter value is greater than a locally stored counter value. After verification succeeds, the terminal calculates a UE-update-MAC on the terminal side in a same calculation manner as that of the AUSF network element. If the UE-update-MAC is the same as the received update-MAC, verification succeeds, and it is finally confirmed that the update parameter and the first security parameter are not tampered with.

Optionally, an integrity verification manner may be as follows. The terminal calculates a UE-update-MAC on the terminal side in a same calculation manner as that of the AUSF network element. If the UE-update-MAC is the same as the received update-MAC, verification succeeds, and it is finally confirmed that the update parameter and the first security parameter are not tampered with.

Further, optionally, after updating the USIM parameter, the terminal performs feedback to the first UDM network element. Specifically, a method for the feedback specifically includes steps S1408 to S1410.

S1408: The terminal sends a first feedback message to the AMF network element.

The first feedback message may be an uplink NAS message.

Correspondingly, the AMF network element receives the uplink NAS message sent by the terminal.

The message includes a UE-counter-MAC, and the UE-counter-MAC is used to perform integrity protection on the count value received by the UE side. Optionally, the message further includes a USIM response, and optionally, further includes a UE response.

The UE-counter-MAC is generated based on a protection key and the received counter. Optionally, the USIM-response and/or the UE response are/is also optional parameters for generating the UE-counter-MAC.

S1409: The AMF network element sends a second feedback message to the first UDM network element.

Correspondingly, the first UDM network element receives the second feedback response sent by the AMF network element.

The message includes the UE-counter-MAC; optionally, further includes the USIM response; and optionally, further includes the UE response.

In a possible implementation, the AMF network element returns an NUDM_SDM_Notification Response service response to send the second feedback response to the first UDM network element.

S1410: The first UDM network element receives the second feedback message sent by the AMF network element.

The first UDM network element checks whether the received UE-counter-MAC is the same as the counter-MAC received from the AUSF network element. If they are the same, it indicates that the UE has updated the update parameter and/or the first security parameter.

In the foregoing procedure, a calculation function for the update-MAC, the UE-update-MAC, the counter-MAC, and the UE-counter-MAC may be any message verification code function, for example, a key-related hash operation message authentication code or a key derivation function. This is not limited. The foregoing procedure is described by using the USIM as an example. Alternatively, another UICC may be used. This is not limited.

In addition, it should be noted that, in the foregoing procedure, the USIM parameter may be updated, or the ME parameter may be updated, or both the USIM parameter and the ME parameter may be updated.

For example, the update parameter may include only the ME parameter, or include only the USIM parameter.

For example, the update parameter may further include a parameter that needs to be updated by both the USIM and the ME. A UDM network element may use the parameter that needs to be updated by both the USIM and the ME as an input parameter for calculating the first security parameter, to obtain the first security parameter; and send the parameter to the AUSF network element, so that the AUSF network element uses the parameter that needs to be updated by both the USIM and the ME as input for calculating the update-MAC. In addition, the UDM network element also sends the parameter to the UE, so that the UE uses the parameter that needs to be updated by both the USIM and the ME as input for calculating the UE-update-MAC, to obtain the UE-update-MAC. The UE compares the UE-update-MAC with the update-MAC to check correctness of the update-MAC. If the check succeeds, the UE updates a related parameter in the ME, and sends the first security parameter to the USIM.

For example, the update parameter may further include a parameter that needs to be updated by both the USIM and the ME. A UDM network element may use this parameter as an input parameter for calculating a second security parameter, to obtain the second security parameter; and send the parameter and the second security parameter to the AUSF network element, so that the AUSF network element uses the parameter and the second security parameter as input for calculating the update-MAC. In addition, the UDM network element also sends, to the UE, the second security parameter and the parameter that needs to be updated by both the USIM and the ME. The UE uses the second security parameter and the parameter that needs to be updated by both the USIM and the ME as input for calculating the UE-update-MAC, to obtain the UE-update-MAC. The UE compares the UE-update-MAC with the update-MAC to check correctness of the update-MAC. If the check succeeds, the UE updates a related parameter in the ME, and sends the first security parameter and the second security parameter to the USIM.

For example, a security parameter (the first security parameter and/or the second security parameter) may include a corresponding parameter and security check information. If the security parameter includes only the security check information, the UE needs to send the corresponding parameter and the security parameter to the USIM. In addition, the USIM parameter needs to be retained in the update parameter.

In a possibility, a security parameter (the first security parameter and/or the second security parameter) may include a corresponding parameter and security check information. In this case, the USIM parameter may be alternatively removed from the update parameter, and the update parameter includes only the ME parameter and/or the parameter that needs to be updated by both the USIM and the ME.

In a possibility, if the update parameter includes the USIM parameter, the UDM network element may not calculate the first security parameter and/or the second security parameter, but only sends the update parameter to the AUSF network element, so that the AUSF network element calculates the update-MAC based on the update parameter. The first security parameter and/or the second security parameter do/does not need to be reflected in other subsequent procedures In a possibility, the UDM network element may further send, to the AUSF network element, an indication indicating whether the UE needs to send a response message. The AUSF network element uses the indication indicating whether the UE needs to send a response message as input for calculating the update-MAC. The UDM network element also sends, to the UE, the indication indicating whether the UE needs to send a response message. The UE uses the indication indicating whether the UE needs to send a response message as input for calculating the UE-update-MAC, and checks whether the calculated UE-update-MAC is consistent with the received update-MAC. If they are consistent, the UE sends a response message to the UDM network element.

In a possibility, the UDM network element may further send, to the AUSF network element, an indication indicating whether the UE needs to be re-registered. The AUSF network element uses the indication indicating whether the UE needs to be re-registered as input for calculating the update-MAC. The UDM network element also sends the indication indicating whether the UE needs to be re-registered to the UE. The UE uses the indication indicating whether the UE needs to be re-registered as input for calculating the UE-update-MAC, and checks whether the calculated UE-update-MAC is consistent with the received update-MAC. If they are consistent, the UE subsequently initiates a re-registration procedure to the UDM network element.

The foregoing embodiments include a case in which the RI needs to be updated, and other parameters may also be updated by using procedures in all the foregoing embodiments.

It can be understood that to implement the foregoing functions, the network elements in the embodiments of this application include corresponding hardware structures and/or software modules for performing the functions. With reference to the units and algorithm steps described in the embodiments disclosed in this application, embodiments of this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, functional units of the network elements may be divided based on the foregoing method examples. For example, the functional units may be divided based on functions, or at least two functions may be integrated in one processing unit. The integrated unit may be implemented in a form of hardware, or may be implemented in a form of a software functional unit. It should be noted that, in this embodiment of this application, unit division is exemplary, and is merely a logical function division. In actual implementation, another division manner may be used.

Figure 13:
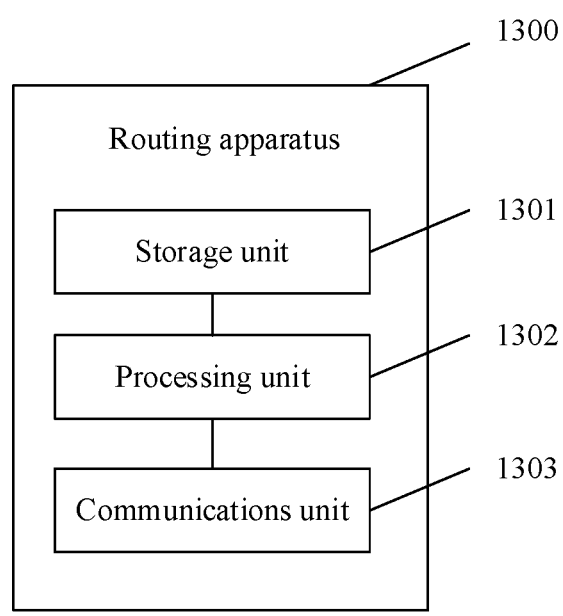
FIG. 13 is a schematic diagram of a structure of a routing apparatus according to an embodiment of this application.

FIG. 13 is a schematic block diagram of a routing apparatus according to an embodiment of this application. The routing apparatus may be the foregoing terminal, AMF network element, AUSF network element, or UDM network element. The routing apparatus 1300 may exist in a form of software, or may be a chip applicable to a device. The routing apparatus 1300 includes a processing unit 1302 and a communications unit 1303.

If the routing apparatus 1300 is the terminal, the processing unit 1302 may be configured to support the terminal to perform S515 in FIG. 5B to FIG. 9C, two-way authentication in FIG. 7B, FIG. 8B, and FIG. 9B, S1103 in FIG. 11, S1209, S1212, and S1213 in FIG. 12, and the like, and/or used for another process in the solutions described in this specification. The communications unit 1303 is configured to support communication between the terminal and another network element (for example, an AMF network element). For example, the communications unit 1303 supports the terminal to perform S501 in FIG. 5A to FIG. 9A, S514 in FIG. 4, S614 in FIG. 6B, S714 in FIG. 7B, S810 in FIG. 8B, S916 in FIG. 9C, S514 in FIG. 10B, S1102 and S1104 in FIG. 11, and S1208 and S1210 in FIG. 12.

If the routing apparatus 1300 is the AMF network element, the processing unit 1302 may be configured to support the AMF network element to perform S502 in FIG. 5A to FIG. 9A, two-way authentication in FIG. 6B, FIG. 7B, FIG. 8B, and FIG. 9B, S1212 and S1213 in FIG. 12, and the like, and/or used for another process in the solutions described in this specification. The communications unit 1303 is configured to support communication between the AMF network element and another network element. For example, the communications unit 1303 supports the AMF network element to perform S501 and S503 in FIG. 5A to FIG. 9A, and S513 in FIG. 5B.

If the routing apparatus 1300 is the AUSF network element, the processing unit 1302 may be used for the AUSF network element to perform S504 in FIG. 5A to FIG. 9A, and/or used for another process in the solutions described in this specification. For example, the communications unit 1303 is configured to support the AUSF network element to perform S503 and S505 in FIG. 5A to FIG. 8A, and S613 in FIG. 6B.

If the routing apparatus 1300 is the UDM network element, the processing unit 1302 may be configured for the UDM network element to perform S506 in FIG. 5A to FIG. 10A, and the like, and/or used for another process in the solutions described in this specification. For example, the communications unit 1303 is configured to support the UDM network element to perform S505 in FIG. 5A to FIG. 10A, and S508 in FIG. 5A to FIG. 7B.

Optionally, the routing apparatus 1300 may further include a storage unit 1301, configured to store program code and data of the routing apparatus 1300. The data may include, but is not limited to, original data, intermediate data, or the like.

In a possible manner, the processing unit 1302 may be a controller or the processor 401 or the processor 405 shown in FIG. 4. For example, the processing unit may be a central processing unit (CPU), a general-purpose processor, a digital signal processor (DSP), an application-specific integrated circuit (ASIC), a field-programmable gate array (FPGA), or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications unit 1303 may be a transceiver, a transceiver circuit, the communications interface 404 shown in FIG. 4, or the like. The storage unit 1301 may be the memory 403 shown in FIG. 4.

A person of ordinary skill in the art may understand that all or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network device (for example, terminal devices). Some or all of the units may be selected based on actual requirements to achieve the objectives of the solutions of the embodiments.

In addition, functional units in the embodiments of this application may be integrated into one processing unit, or each of the functional units may exist independently, or two or more units are integrated into one unit. The integrated unit may be implemented in a form of hardware, or may be implemented in a form of hardware in addition to a software functional unit.

Based on the foregoing descriptions of the implementation manners, a person skilled in the art may clearly understand that this application may be implemented by software in addition to necessary universal hardware or by hardware only. In most circumstances, the former is a preferred implementation manner. Based on such an understanding, the technical solutions of this application essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for updating a parameter, comprising:
   sending, by a unified data management network element, an integrity protection request message to an authentication server function network element, wherein the integrity protection request message comprises an update parameter, and the update parameter comprises a routing indicator (RI), wherein the RI is used to address the unified data management network element;
   generating, by the authentication server function network element, an integrity verification code for the update parameter based on a protection key Kausf, a counter stored in the authentication server function network element, and the update parameter;
   sending, by the authentication server function network element, an integrity protection response message to the unified data management network element, wherein the integrity protection response message comprises the integrity verification code for the update parameter and the counter;
   receiving, by the unified data management network element, the integrity protection response message from the authentication server function network element; and
   sending, by the unified data management network element via an access and mobility management function network element to a user equipment (UE), the update parameter, the counter, the integrity verification code for the update parameter, a first indication indicating whether apparatus needs to send a response message and a second indication indicating whether the apparatus needs re-registration.

2. The method according to claim 1, wherein
   the generating, by the authentication server function network element, the integrity verification code for the update parameter based on the protection key Kausf, the counter stored in the authentication server function network element, and the update parameter comprises:
   generating, by the authentication server function network element, the integrity verification code for the update parameter based on the protection key Kausf, the counter stored in the authentication server function network element, the indication indicating whether the UE needs to send a response message, and the update parameter.

3. The method according to claim 1, wherein the integrity protection request message further comprises the first indication; and
   the generating, by the authentication server function network element, the integrity verification code for the update parameter based on the protection key Kausf, the counter stored in the authentication server function network element, and the update parameter comprises:
   generating, by the authentication server function network element, the integrity verification code for the update parameter based on the protection key Kausf, the counter stored in the authentication server function network element, the first indication, and the update parameter.

4. The method according to claim 1, wherein the integrity protection request message further comprises the second indication indicating whether the UE needs re-registration; and
   the generating, by the authentication server function network element, the integrity verification code for the update parameter based on the protection key Kausf, the counter stored in the authentication server function network element, and the update parameter comprises:
   generating, by the authentication server function network element, the integrity verification code for the update parameter based on the protection key Kausf, the counter stored in the authentication server function network element, and the second indication, and the update parameter.

5. The method according to claim 1, further comprising:
   receiving, by the access and mobility management function network element, a first feedback message from the UE; and
   in response to receiving the first feedback message, sending, by the access and mobility management function network element, a second feedback message to the unified data management network element.

6. The method according to claim 5, wherein the first feedback message comprises a user equipment counter message authentication code which is used to perform integrity protection on the counter received by the UE.

7. The method according to claim 5, wherein first feedback message further comprises a universal subscriber identity module (USIM) response.

8. The method according to claim 5, wherein first feedback message is an uplink non-access stratum (NAS) message.

9. A method for updating a parameter, comprising:
   receiving, by an apparatus via an access and mobility management function network element, a configuration modification request message from a unified data management network element; wherein the configuration modification request message comprises an update parameter, a counter, an integrity verification code for the update parameter, a first indication indicating whether apparatus needs to send a response message and a second indication indicating whether the apparatus needs re-registration, and the update parameter comprises a routing indicator (RI), wherein the RI is used to address the unified data management network element;
   performing, by the apparatus, integrity verification on the integrity verification code based on a protection key Kausf, the update parameter, and the counter; and
   after the verification succeeds, updating, by the apparatus, using the update parameter, a parameter stored in the apparatus.

10. The method according to claim 9, wherein
    the performing, by the apparatus, integrity verification on the integrity verification code for the update parameter based on the protection key Kausf, the update parameter, and the counter comprises:
    performing, by the apparatus, integrity verification on the integrity verification code for the update parameter based on the protection key Kausf, the update parameter, the counter, and the first indication.

11. The method according to claim 9, wherein
    the performing, by the apparatus, integrity verification on the integrity verification code for the update parameter based on the protection key Kausf, the update parameter, and the counter comprises:
    performing, by the apparatus, integrity verification on the integrity verification code for the update parameter based on the protection key Kausf, the update parameter, the counter, and the second indication.

12. The method according to claim 9, wherein before the performing, by the terminal, integrity verification on the integrity verification code for the update parameter based on the protection key Kausf, the update parameter, and the counter, the method further comprises:
- determining, by the apparatus, whether a received counter is greater than a locally stored counter; and
- the performing, by the apparatus, integrity verification on the integrity verification code for the update parameter based on a protection key Kausf, the update parameter, and the counter comprises:
  - if the received counter is greater than the locally stored counter, performing, by the apparatus, integrity verification on the integrity verification code for the update parameter based on the protection key Kausf, the update parameter, and the counter.

13. The method according to claims 9, wherein the method further comprises:
- sending, by the apparatus according to the first indication, a configuration modification response message to the access and mobility management function network element.

14. The method according to claims 9, wherein the method further comprises:
- initiating, by the apparatus according to the second indication, a re-registration based on the RI.

15. An apparatus, comprising:
- a processor coupled to a memory storing instructions and configured to execute the instructions to cause the apparatus to:
- receive, via an access and mobility management function network element, a configuration modification request message from a unified data management network element, wherein the configuration modification request message comprises an update parameter, a counter, an integrity verification code for the update parameter, a first indication indicating whether apparatus needs to send a response message and a second indication indicating whether the apparatus needs re-registration, and the update parameter comprises a routing indicator RI, wherein the RI is used to address the unified data management network element;
- perform integrity verification on the integrity verification code based on the protection key Kausf, the update parameter, and the counter, and
- after the verification succeeds, update, using the update parameter, a parameter stored in the apparatus.

16. The apparatus according to claim 15,
wherein the instructions, when be executed, -cause the apparatus to:
perform integrity verification on the integrity verification code for the update parameter based on the protection key Kausf, the update parameter, the counter, and the first indication.

17. The apparatus according to claim 15,
wherein the instructions, when be executed, -cause the apparatus to:
perform integrity verification on the integrity verification code for the update parameter based on the protection key Kausf, the update parameter, the counter, and the second indication.

18. The apparatus according to claim 15,
wherein the instructions, when be executed, -cause the apparatus to:
determine whether a received counter is greater than a locally stored counter, and if the received counter is greater than the locally stored counter, perform integrity verification on the integrity verification code for the update parameter based on the protection key Kausf, the update parameter, and the counter.

19. The apparatus according to claim 15, wherein the instructions, when be executed, further cause the apparatus to send a configuration modification response message to the access and mobility management function network element.

20. The apparatus according to claim 15, wherein the apparatus is a user equipment (UE) or a chip in the UE.

21. The apparatus according to claim 15, wherein the instructions, when be executed, further cause the apparatus to:
- initiate, according to the second indication, a re-registration based on the RI.

22. A system for updating a parameter, comprising:
- a unified data management network element comprising:
  - a first memory configured to store first instructions; and
  - one or more first processors coupled to the first memory and configured to execute the first instructions to cause the unified data management network element to:
  - send an integrity protection request message to an authentication server function network element, wherein the integrity protection request message comprises an update parameter, and the update parameter comprises a routing indicator (RI), wherein the RI is used to address the unified data management network element;
- wherein
  - the authentication server function network element comprising:
  - a second memory configured to store second instructions; and
  - one or more first processors coupled to the second memory and configured to execute the second instructions to the authentication server function network element to:
  - receive the integrity protection request message;
  - generate an integrity verification code for the update parameter based on a protection key Kausf, a counter stored in the authentication server function network element, and the update parameter; and
  - send an integrity protection response message to the unified data management network element, wherein the integrity protection response message comprises the integrity verification code for the update parameter and the counter;
- the unified data management network element is further configured to:
  - receive the integrity protection response message from the authentication server function network element; and
  - send, via an access and mobility management function network element to a user equipment (UE), the update parameter, the counter, the integrity verification code for the update parameter, a first indication indicating whether apparatus needs to send a response message and a second indication indicating whether the apparatus needs re-registration.

23. The system according to claim 22, wherein the integrity protection request message further comprises an indication indicating whether the UE needs re-registration: wherein the authentication server function network element is configured to generate the integrity verification code by:

generating the integrity verification code for the update parameter based on the protection key Kausf, the counter stored in the authentication server function network element, the indication indicating whether the UE needs re-registration, and the update parameter.

24. The system according to claim 22, wherein the integrity protection request message further comprises an indication indicating whether the UE needs to send a response message, and the indication indicating whether the UE needs re-registration; wherein the authentication server function network element is configured to generate the integrity verification code by:

generating the integrity verification code for the update parameter based on the protection key Kausf, the counter stored in the authentication server function network element, the indication indicating whether the UE needs to send a response message, the indication indicating whether the UE needs re-registration, and the update parameter.

* * * * *